US008681239B2

(12) United States Patent
Morioka et al.

(10) Patent No.: US 8,681,239 B2
(45) Date of Patent: Mar. 25, 2014

(54) IMAGE CAPTURING DEVICE, IMAGE CAPTURING METHOD, PROGRAM, AND INTEGRATED CIRCUIT

(75) Inventors: Yoshihiro Morioka, Nara (JP); Kenji Matsuura, Nara (JP); Takuma Masuda, Osaka (JP); Hiroji Takebayashi, Hyogo (JP); Eiji Yamauchi, Osaka (JP)

(73) Assignee: Panasonic Corporation, Osaka (JP)

( * ) Notice: Subject to any disclaimer, the term of this patent is extended or adjusted under 35 U.S.C. 154(b) by 308 days.

(21) Appl. No.: 13/145,425

(22) PCT Filed: Apr. 6, 2010

(86) PCT No.: PCT/JP2010/002498
§ 371 (c)(1),
(2), (4) Date: Jul. 20, 2011

(87) PCT Pub. No.: WO2010/116715
PCT Pub. Date: Oct. 14, 2010

(65) Prior Publication Data
US 2012/0019685 A1    Jan. 26, 2012

(30) Foreign Application Priority Data

Apr. 7, 2009   (JP) ................................ 2009-092621
Feb. 4, 2010   (JP) ................................ 2010-022940

(51) Int. Cl.
*H04N 5/225*   (2006.01)
(52) U.S. Cl.
USPC .................................... 348/222.1; 348/220.1
(58) Field of Classification Search
USPC .......................................... 348/222.1, 220.1
See application file for complete search history.

(56) References Cited

U.S. PATENT DOCUMENTS 6,618,491 B1    9/2003  Abe
6,882,793 B1    4/2005  Fu et al.
(Continued)

FOREIGN PATENT DOCUMENTS

JP          10-91794       4/1998
JP         2003-134384     5/2003
(Continued)

OTHER PUBLICATIONS

Morioka et al, WO2008111308, Sep. 18, 2008.*
International Search Report issued Jul. 13, 2010 in International (PCT) Application No. PCT/JP2010/002498.

*Primary Examiner* — Nicholas Giles
*Assistant Examiner* — Abdelaaziz Tissire
(74) *Attorney, Agent, or Firm* — Wenderoth, Lind & Ponack, L.L.P.

(57) ABSTRACT

A camcorder (100), which is an example of image capturing devices, includes the following units. An imaging unit (110) captures moving pictures. An attribute information generation unit (120) generates attribute information indicating features of the moving pictures captured by the imaging unit (110). An evaluation unit (130) applies the attribute information generated by the attribute information generation unit (120) to a predetermined criterion, so as to calculate an evaluation value of the moving pictures for each predetermined time width. A still picture extraction unit (140) extracts a still picture from moving pictures in a predetermined time width, when the evaluation value calculated by the evaluation unit (130) for the predetermined time width exceeds an evaluation threshold value. A threshold value change unit (150) changes the evaluation threshold value based on at least one of person information and a composition change amount which are included in the attribute information. The person information is used for specifying a person captured in the moving pictures, and the composition change amount is an amount of change in image compositions between the moving pictures.

10 Claims, 14 Drawing Sheets

(56) References Cited

U.S. PATENT DOCUMENTS

| | | | |
|---|---|---|---|
| 7,748,022 B1 * | 6/2010 | Frazier | 725/105 |
| 2003/0090505 A1 * | 5/2003 | McGee et al. | 345/721 |
| 2004/0085483 A1 * | 5/2004 | Li et al. | 348/700 |
| 2007/0140662 A1 | 6/2007 | Nunomaki | |
| 2008/0019610 A1 * | 1/2008 | Matsuzaka et al. | 382/284 |
| 2008/0240503 A1 * | 10/2008 | Okada et al. | 382/103 |
| 2008/0310727 A1 * | 12/2008 | Wu et al. | 382/190 |
| 2009/0097816 A1 * | 4/2009 | Nakate et al. | 386/52 |
| 2009/0103898 A1 * | 4/2009 | Morioka et al. | 386/117 |
| 2009/0110372 A1 * | 4/2009 | Morioka et al. | 386/117 |
| 2009/0116700 A1 | 5/2009 | Wakabayashi et al. | |
| 2009/0135257 A1 * | 5/2009 | Takagi et al. | 348/207.2 |
| 2010/0091113 A1 * | 4/2010 | Morioka et al. | 348/207.1 |
| 2010/0189356 A1 * | 7/2010 | Sugita | 382/190 |

FOREIGN PATENT DOCUMENTS

| | | |
|---|---|---|
| JP | 2006-287893 | 10/2006 |
| JP | 2008-227860 | 9/2008 |
| JP | 2008-283605 | 11/2008 |
| JP | 2009-116600 | 5/2009 |
| WO | 2008/032739 | 3/2008 |

* cited by examiner

FIG. 5

| Scene Number | Start Time | End Time | Representative Time |
|---|---|---|---|
| 1 | 0:00:00 | 0:00:15 | 0:00:10 |
| 2 | 0:00:15 | 0:00:30 | 0:00:15 |
| 3 | 0:00:30 | 0:01:01 | 0:00:45 |
| 4 | 0:01:01 | 0:03:00 | 0:02:30 |
| 5 | 0:03:00 | 0:05:30 | 0:05:00 |
| 6 | 0:05:30 | 0:06:00 | 0:05:40 |
| . | . | . | . |
| . | . | . | . |
| . | . | . | . |

FIG. 6

| Identifiers | Kinds of Attribute Information | Evaluation Values |
|---|---|---|
| A | Clip In | 100 |
| B | Extraction of Certain Audio | 70 |
| C | Capturing Still (after camera work) | 40 |
| D | Zoom Up | 30 |
| E | Pan, Tilt | 25 |
| F | Clip Out | 90 |
| G | Zoom Down | 30 |
| H | Extraction of Certain Color | 50 |
| I | Hand Shake Blur | -20 |
| J | Capturing Ground (in Vertical and Downward Direction) | -10 |
| K | | |
| ⋮ | ⋮ | ⋮ |
| X | Face Recognition (Person A) | 100 |
| Y | Face Recognition (Person B) | 80 |
| Z | Face Detection | 40 |

FIG. 8

| Scene Number | Start Time | End Time | Representative Time |
|---|---|---|---|
| 1 | 0:00:00 | 0:01:00 | 0:00:30 |
| 2 | 0:11:40 | 0:13:00 | 0:12:10 |
| 3 | 0:21:10 | 0:22:45 | 0:22:40 |

FIG. 9

| Identifiers | Kinds of Attribute Information | Evaluation Values |
|---|---|---|
| A | Clip In | 20 |
| B | Extraction of Certain Audio | 10 |
| C | Capturing Still (after camera work) | 80 |
| D | Zoom Up | 40 |
| E | Pan, Tilt | 5 |
| F | Clip Out | 20 |
| G | Zoom Down | 20 |
| H | Extraction of Certain Color | 60 |
| I | Hand Shake Blur | -20 |
| J | Capturing Ground (in Vertical and Downward Direction) | -10 |
| K | | |
| ⋮ | ⋮ | ⋮ |
| X | Face Recognition (Person A) | 100 |
| Y | Face Recognition (Person B) | 80 |
| Z | Face Detection | 40 |

FIG. 11

|  | Face of Person A | Face of Person B | Face of Any Other Person |
|---|---|---|---|
| When an amount of change in compositions is large | 10 Seconds | 30 Seconds | 60 Seconds |
| When an amount of change in compositions is small | 60 Seconds | 120 Seconds | 300 Seconds |

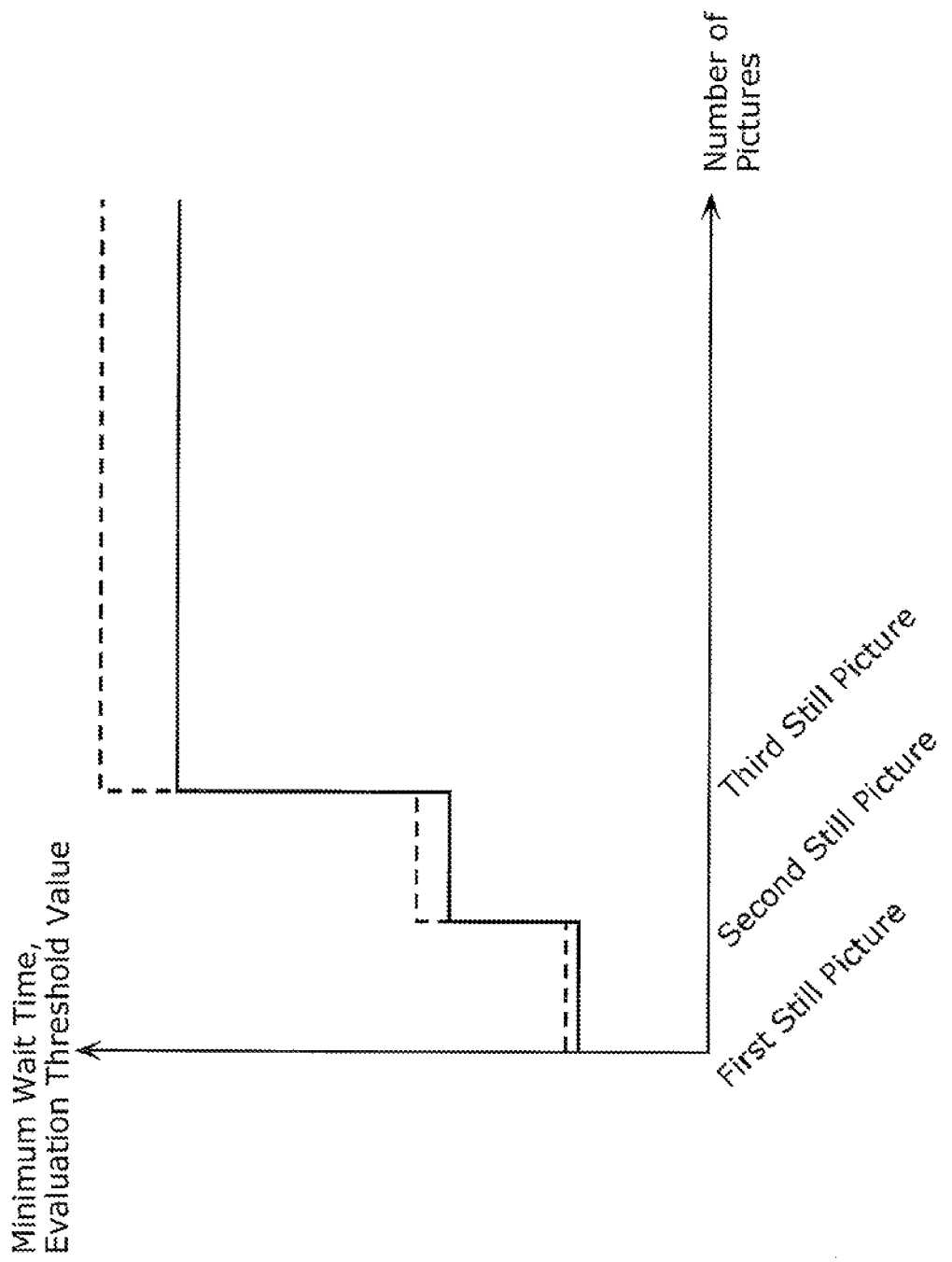

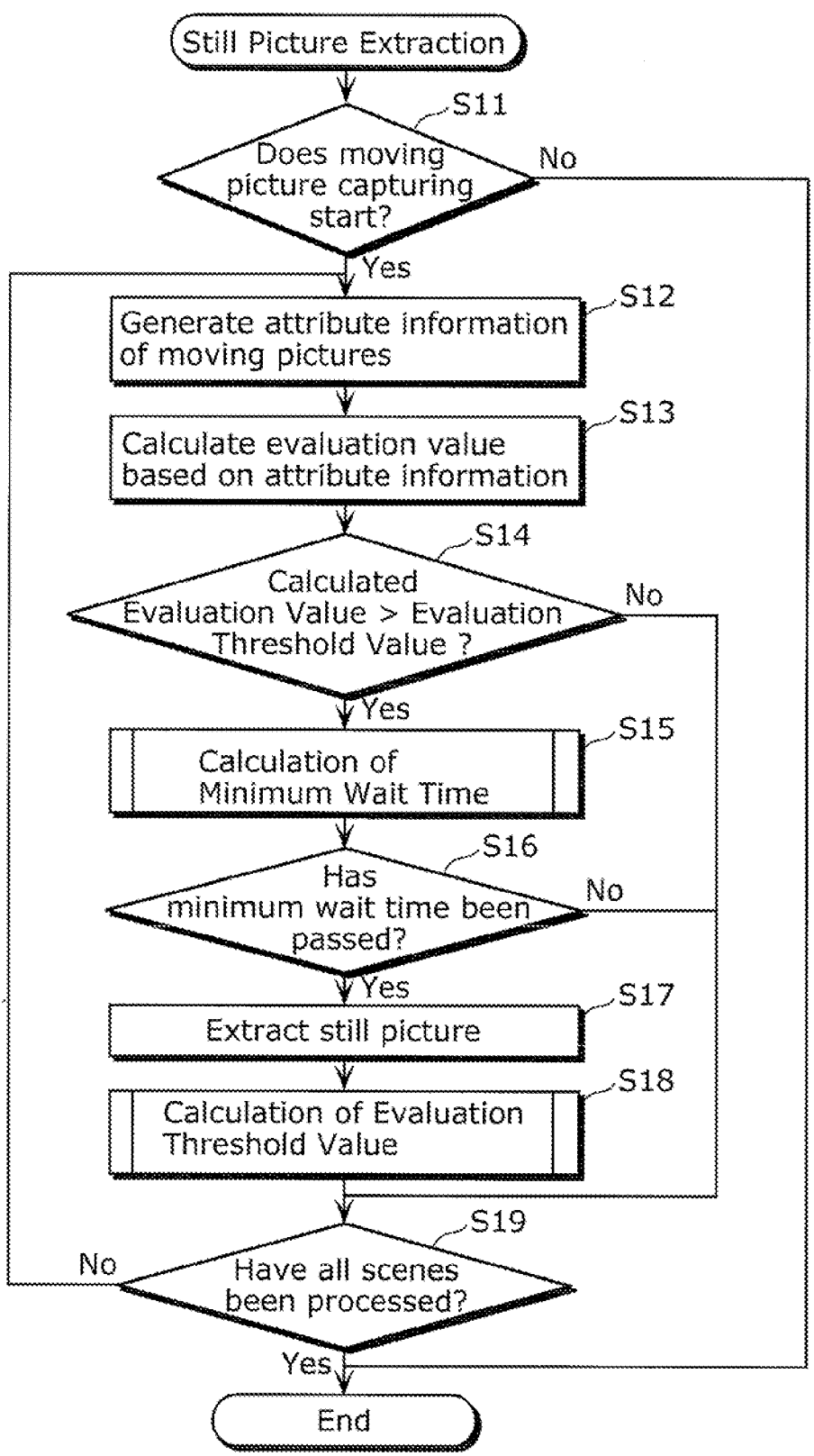

IMAGE CAPTURING DEVICE, IMAGE CAPTURING METHOD, PROGRAM, AND INTEGRATED CIRCUIT

TECHNICAL FIELD

The present invention relates to image capturing devices that capture video, and more particularly to an image capturing device that automatically extracts still pictures from captured video.

BACKGROUND ART

Currently, there are camcorders capable of capturing moving pictures (video) and also recording still pictures at the same time. In order to record a still picture, a user presses a button or the like while capturing moving pictures. Such a camcorder is also capable of automatically generating a digest (digest video) from the captured moving pictures, for example. For instance, Patent Reference 1 discloses a video capturing device that evaluates scenes of captured moving pictures based on metadata (attribute information), and reduces the number of the scenes or clips of the moving pictures based on a result of the evaluation to easily generate a digest (digest video).

PRIOR ARTS

Patent References

Patent Reference 1: Japanese Unexamined Patent Application Publication No. 2008-227860

DISCLOSURE OF INVENTION

Problems that Invention is to Solve

However, there are none capable of both capturing of moving pictures and automatic extraction of an appropriate still picture at the same time. Especially when there is no difference among captured moving pictures, or when such difference is minor, none is capable of automatically generating both moving pictures and an appropriate still picture at the same time.

In order to address the above-described problem, an object of the present invention is to provide an image capturing device capable of capturing moving pictures and automatically extracting an appropriate still picture from the moving pictures at the same time.

Means to Solve the Problems

In accordance with an aspect of the present invention for achieving the object, there is provided an image capturing device including: an imaging unit configured to capture moving pictures; an attribute information generation unit configured to generate attribute information indicating features of the moving pictures captured by the imaging unit; an evaluation unit configured to apply the attribute information generated by the attribute information generation unit to a predetermined evaluation criterion, so as to calculate an evaluation value of the moving pictures for each predetermined time width; a still picture extraction unit configured, when the evaluation value calculated by the evaluation unit exceeds an evaluation threshold value, to extract a still picture from the predetermined time width corresponding to the exceeding evaluation value among the moving pictures; and a threshold value change unit configured to change the evaluation threshold value based on at least one of person information and a composition change amount which are included in the attribute information, the person information being used for specifying a person captured in the moving pictures, and the composition change amount being an amount of change in image compositions between the moving pictures.

With the above structure, while capturing moving pictures, the image capturing device can automatically extract, from the captured moving pictures, a still picture on which an appropriate scene is captured. It should be noted that the term "composition" in the description of this application refers to a composition of an overall image consisting of a captured object and a background, or an arrangement of elements and portions constituting the image.

The threshold value change unit may be configured to increment the evaluation threshold value at a predetermined increasing rate every time the still picture is extracted by the still picture extraction unit, while the composition change amount is kept equal to or smaller than a predetermined amount. With the above structure, the image capturing device can extract still pictures of various different images. For example, the image capturing device decreases the occurrence frequency of the still picture extraction when the composition change amount is small, and increases it when the composition change amount is large.

The evaluation criterion may define a correspondence relationship between the person information and the evaluation value, the evaluation value being associated with a case where the person is captured in the moving pictures. The threshold value change unit may be configured to change the predetermined increasing rate smaller as the evaluation value associated with the person information included in the attribute information is higher. With the above structure, the image capturing device can change the still picture extraction method for each person captured as an object. As a result, it is possible to capture still pictures appropriate for each person.

The threshold value change unit may be configured to: change the evaluation threshold value to be a predetermined initial value every predetermined time period; and change the predetermined time period based on at least one of the person information and the composition change amount. With the above structure, based on a person captured as an object or on a composition change amount, the image capturing device can change a time period until the evaluation threshold value is changed back to the initial value. As a result, still pictures can be extracted depending on a captured person or a composition change amount.

The still picture extraction unit may be configured to extract a second still picture after at least a minimum wait time has passed since extraction of a first still picture. The image capturing device may further include an extraction interval change unit configured to change the minimum wait time based on at least one of the person information and the composition change amount. With the above structure, the image capturing device can extract appropriate still pictures depending on a captured person, a composition change amount, or the like.

The evaluation criterion may define a correspondence relationship between the person information and the evaluation value, the evaluation value being associated with a case where the person is captured in the moving pictures. The extraction interval change unit may be configured to change the minimum wait time shorter as the evaluation value associated with the person information included in the attribute information is higher. The extraction interval change unit may be configured to change the minimum wait time shorter as the composition change amount is larger.

The extraction interval change unit may be configured to increment the minimum wait time at a predetermined increasing rate every time the still picture is extracted by the still picture extraction unit, while the composition change amount is kept equal to or smaller than a predetermined amount. With the above structure, when the composition change amount is smaller than a predetermined change amount, the image capturing device can decrease with time the occurrence frequency of the still picture extraction.

The extraction interval change unit may be configured to change the minimum wait time to a predetermined initial value, when the composition change amount exceeds a predetermined value. With the above structure, when content of a captured moving picture is changed again from others, for example, when there is a change in a composition, a captured person, or the like, the image capturing device can perform setting to increase occurrence frequency of the still picture extraction.

In accordance with another aspect of the present invention, there is provided an image capturing method including: capturing moving pictures; generating attribute information indicating features of the moving pictures captured in the capturing; applying the attribute information generated in the generating to a predetermined evaluation criterion, so as to calculate an evaluation value of the moving pictures for each predetermined time width; extracting a still picture from the predetermined time width corresponding to an evaluation value calculated in the applying among the moving pictures, when the evaluation value exceeds an evaluation threshold value; and changing the evaluation threshold value based on at least one of person information and a composition change amount which are included in the attribute information, the person information being used for specifying a person captured in the moving pictures, and the composition change amount being an amount of change in image compositions between the moving pictures.

In accordance with still another aspect of the present invention, there is provided a program causing a computer to capture image. More specifically, a program causes a computer to capture image, the program causing the computer to execute: capturing moving pictures; generating attribute information indicating features of the moving pictures captured in the capturing; applying the attribute information generated in the generating to a predetermined evaluation criterion, so as to calculate an evaluation value of the moving pictures for each predetermined time width; extracting a still picture from the predetermined time width corresponding to an evaluation value calculated in the applying among the moving pictures, when the evaluation value exceeds an evaluation threshold value; and changing the evaluation threshold value based on at least one of person information and a composition change amount which are included in the attribute information, the person information being used for specifying a person captured in the moving pictures, and the composition change amount being an amount of change in image compositions between the moving pictures.

In accordance with still another aspect of the present invention, there is provided an integrated circuit including: an imaging unit configured to capture moving pictures; an attribute information generation unit configured to generate attribute information indicating features of the moving pictures captured by the imaging unit; an evaluation unit configured to apply the attribute information generated by the attribute information generation unit to a predetermined evaluation criterion, so as to calculate an evaluation value of the moving pictures for each predetermined time width; a still picture extraction unit configured, when the evaluation value calculated by the evaluation unit exceeds an evaluation threshold value, to extract a still picture from the predetermined time width corresponding to the exceeding evaluation value among the moving pictures; and a threshold value change unit configured to change the evaluation threshold value based on at least one of person information and a composition change amount which are included in the attribute information, the person information being used for specifying a person captured in the moving pictures, and the composition change amount being an amount of change in image compositions between the moving pictures.

In accordance with still another aspect of the present invention, there is provided the following image capturing device. More specifically, there is a provided an image capturing device that captures moving pictures and a still picture, the image capturing device including: an attribute information generation unit configured to generate attribute information regarding the capturing of the moving pictures; and an image analysis unit configured to extract, based on the attribute information, a still picture from the moving pictures while capturing the moving pictures.

With the above structure, the image capturing device can automatically extract still pictures of appropriate images, while capturing the moving pictures.

The image capturing device may further include a scene analysis unit configured to evaluate each of scenes consisting of the moving pictures based on the attribute information, wherein the image analysis unit is configured to extract, based on the evaluation value of the scene analysis unit and the attribute information, a still picture from the moving pictures while capturing the moving pictures.

With the above structure, the image capturing device can generate a digest (digest video) from the captured moving pictures, and also automatically extract still pictures of appropriate images from the moving pictures.

The image capturing device may further include a scene analysis unit configured to evaluate each of scenes based on the attribute information, wherein the image analysis unit is configured to extract, based on the attribute information and an evaluation method different from that employed by the scene analysis unit, a still picture from the moving pictures while capturing the moving pictures.

With the above structure, the image capturing device can automatically extract still pictures of appropriate images from the captured moving pictures based on characteristics which differ between moving pictures and still pictures.

The image capturing device may further include a storage unit configured to store the still picture, wherein the image analysis unit configured to select only one of a first still picture and a second still picture to be stored into the storage unit, when a similarity between the first still picture and the second still picture is within a predetermined range, the first still picture being extracted while capturing the moving pictures, and the second still picture having being stored in the storage unit.

With the above structure, even if there are a series of still pictures of appropriate images, the image capturing device can extract a still picture of a more appropriate image from them.

The image analysis unit may calculate the similarity based on at least one of: compositions of the first still picture and the second still picture; capturing times of the first still picture and the second still picture; and pieces of information of scenes evaluated by the scene analysis unit, the scenes being a scene including the first still picture and a scene including the second still picture.

With the above structure, it is possible to prevent that the series of still pictures are extracted to provide similar still pictures.

The image capturing device may further include a moving picture signal compression unit configured to code information of captured moving pictures, wherein the image analysis unit is configured to extract a still picture from the information of the moving pictures that have not yet been coded.

With the above structure, it is possible to extract still pictures from signals of the moving pictures which have not yet been coded. As a result, the image capturing device can generate still pictures without damaging their data due to irreversible transformation such as coding.

Effects of the Invention

The present invention makes it possible to automatically extract an appropriate still picture from moving pictures, while capturing the moving pictures.

BRIEF DESCRIPTION OF DRAWINGS

FIG. 5 is a table of information for identifying scenes according to the embodiment of the present invention.

FIG. 6 is a table of a relationship between scene attribute information and an evaluation value according to the embodiment of the present invention.

FIG. 8 is a table of details of reproduction information according to the embodiment of the present invention.

FIG. 9 is a table of a relationship between attribute information and an evaluation value for still picture extraction according to the embodiment of the present invention.

FIG. 11 is a table of a relationship among a change in compositions, a recognized object person, and a capturing time interval according to the embodiment of the present invention.

FIG. 12 is a graph of a relationship among the number of captured pictures, a minimum wait time, and an evaluation threshold value according to the embodiment of the present invention.

FIG. 13 is a flowchart of an example of the still picture extraction.

BEST MODE FOR CARRYING OUT THE INVENTION (First Embodiment)
<1. Structure of Image Capturing Device>

Figure 1:
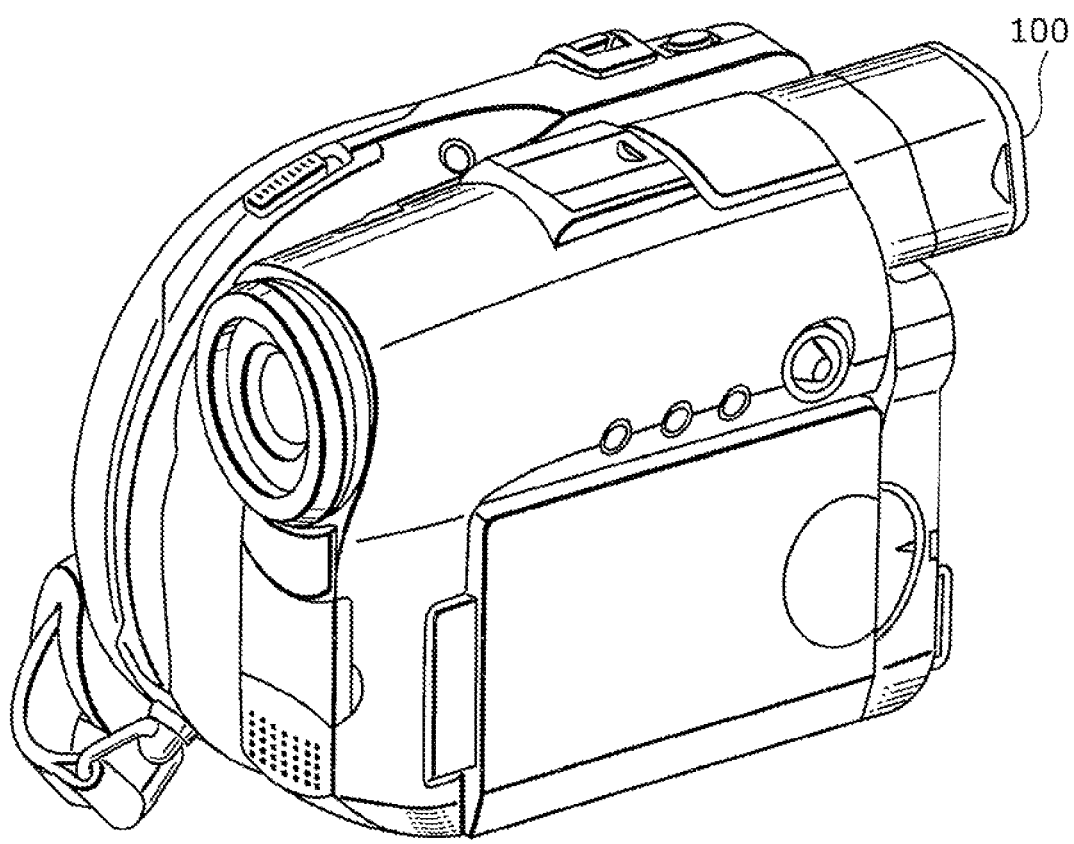
FIG. 1 is an external view of a camcorder according to an embodiment of the present invention.

FIG. 1 is an external view of a camcorder (image capturing device) 100 which captures moving pictures and still picture(s). The first embodiment of the present invention will be described for the camcorder 100.

Figure 2:
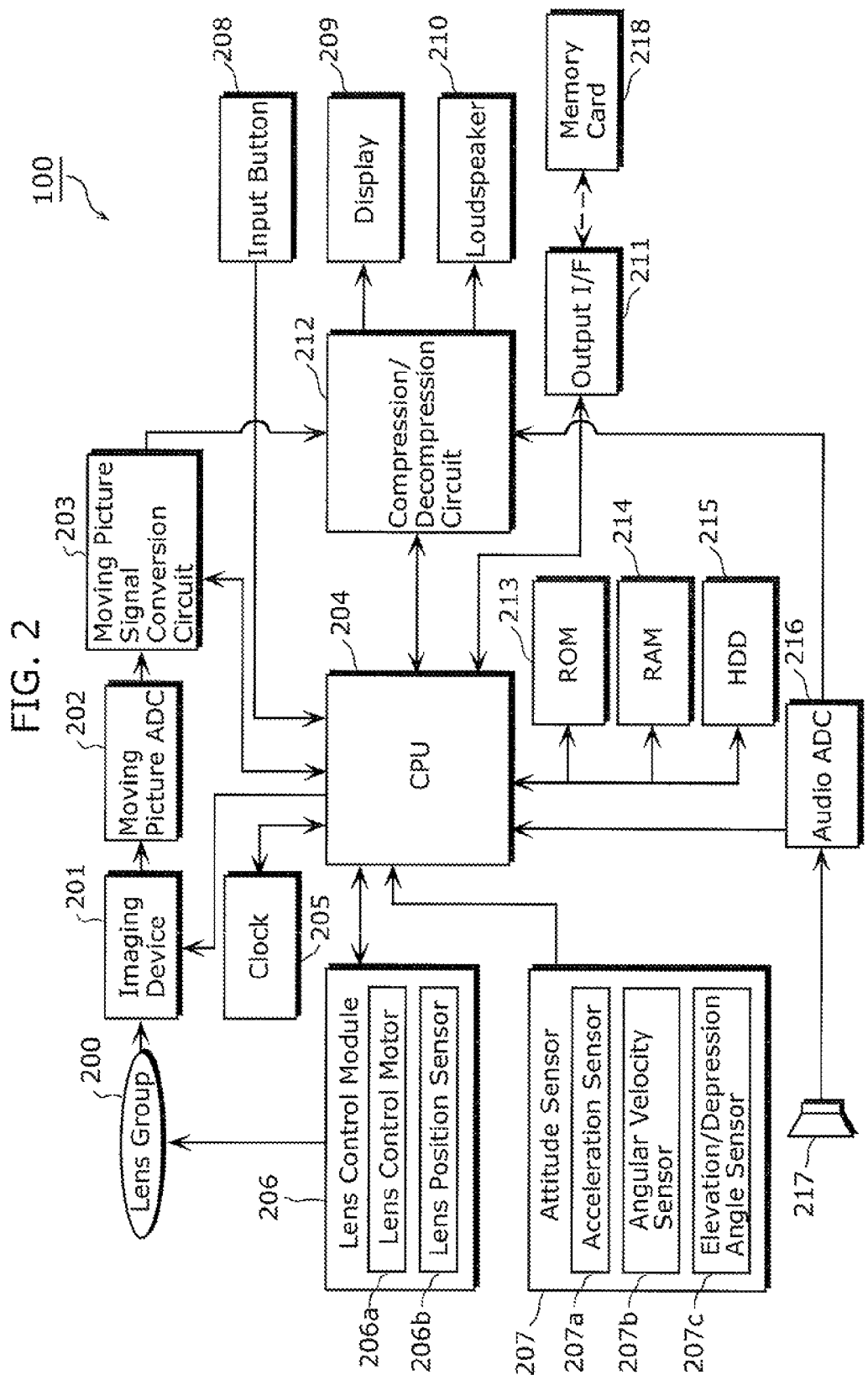
FIG. 2 is a hardware block diagram of the inside of the camcorder according to the embodiment of the present invention.

FIG. 2 is a diagram illustrating a schematic hardware structure of the inside of the camcorder 100 of FIG. 1.

The camcorder 100 includes a lens group 200, an imaging device 201, a moving picture Analog to Digital Converter (ADC) 202, a moving picture signal conversion circuit 203, a Central Processing Unit (CPU) 204, a clock 205, a lens control module 206, an attitude sensor 207, an input button 208, a display 209, a loudspeaker 210, an output Interface (I/F) 211, a compression/decompression circuit 212, a Read Only Memory (ROM) 213, a Random Access Memory (RAM) 214, a Hard Disk Drive (HDD) 215, an audio ADC 216, and a microphone 217.

The lens group 200 adjusts light incident from an object to form an object image on the imaging device 201. More specifically, the lens group 200 changes distances among a plurality of lenses having various features, thereby adjusting a focal point distance and a zoom (magnification of video). The adjustment may be performed by hands of a video capturing person (hereinafter, referred to as a "user") of the camcorder 100, or may be performed automatically under the control of the CPU 204 or the like via the lens control module 206 which will be described later.

The imaging device 201 converts light incident through the lens group 200 into electrical signals. The imaging device 201 may be implemented as a Charge Coupled Device (CCD) or Complementary Metal Oxide Semiconductor (C-MOS) image sensor.

The moving picture ADC converts the analog electrical signals provided from the imaging device 201 into digital electrical signals. The digital signals are provided to the moving picture signal conversion circuit 203.

The moving picture signal conversion circuit 203 converts the digital signals provided from the moving picture ADC 202 into moving picture signals (video signals) in a predetermined format such as National Television System Committee (NTSC) or Phase Alternating Line (PAL).

The CPU 204 controls the entire camcorder 100. One of various kinds of controls is lens control by which the CPU 204 causes the lens control module 206 to control the above-described focal point distance of a lens and the zoom in order to control light incident on the imaging device 201. Another is input control on external inputs provided from the input button 208, the attitude sensor 207, and the like. There is also control of operations of the compression/decompression circuit 212. The CPU 204 performs these control algorithms by software or the like.

The clock 205 outputs clock signals to the circuits including the CPU 204 which operate in the camcorder 100 with reference to the clock signals. The clock 205 may employ a single or plurality of clock(s) depending on a using integrated circuit or handling data. It is also possible that a clock signal of a single oscillator is multiplied by a desired number to be used.

The lens control module 206 detects a state of the lens group 200, and thereby causes each lens in the lens group 200 to operate under the control of the CPU 204. The lens control module 206 includes a lens control motor 206a and a lens position sensor 206b.

The lens position sensor 206b detects a distance, a position relationship, or the like among a plurality of lenses constituting the lens group 200. Information of the positions among the plurality of lenses or the like, which is detected by the lens position sensor 206b, is provided to the CPU 204. Based on the information provided from the lens position sensor 206b and information provided from other structural elements such as the imaging device 201, the CPU 204 transmits control signals to the lens control motor 206a to properly position the plurality of lenses.

The lens control motor 206a is a motor for driving the lenses based on the control signals transmitted from the CPU 204. As a result, the relative position relationships among the lenses in the lens group 200 are changed to adjust a focal point distance of a lens and zoom. Thereby, the incident light passing through the lens group 200 forms a target image on the imaging device 201.

It should be noted that the CPU 204 may cause the lens position sensor 206b, the attitude sensor 207 described later, or the like to detect hand shake blurring arising when the camcorder 100 captures moving pictures, and thereby drive the lens control motor 206a. Thereby, the CPU 204 can control the lens control module 206 to perform stabilization to prevent hand shake blurring.

The attitude sensor 207 detects an attitude state of the camcorder 100. The attitude sensor 207 includes an acceleration sensor 207a, an angular velocity sensor 207b, and an elevation/depression angle sensor 207c. These sensors allow the CPU 204 to detect the state of the camcorder 100 capturing pictures. It is desirable that each of the sensors can perform its detection in three-axis directions (vertically, horizontally, and the like) to detect an attitude of the camcorder 100 in detail.

The input button 208 is one of input interfaces used by the user of the camcorder 100. The input button 208 allows the user to send, to the camcorder 100, various requests of start or end of capturing, insertion of a marking in a moving picture during the capturing of moving pictures, for example.

The display 209 is provided to the camcorder 100 so that the user can see moving pictures while the camcorder 100 is capturing them, or when they are stored in the camcorder 100, for example. The display 209 allows the user to immediately check the captured moving pictures. The display 209 may display various information of the camcorder 100 so as to notify the user of more detailed information such as information of the capturing processing or the image capturing device.

The loudspeaker 210 is used to output audio when the captured moving pictures are reproduced. The loudspeaker 210 can also provide sound alarm of the camcorder 100 to the user.

The output I/F 211 is used to provide the moving pictures captured by the camcorder 100 to an external device. Examples of the output I/F 211 are a cable interface for connecting the image capturing device to the external device by a cable, and a memory card interface for recording captured moving pictures onto a portable memory card 218. Therefore, the output I/F 211 enable the user to see the captured moving pictures on an external display larger than the display 209 of the camcorder 100.

The compression/decompression circuit 212 converts captured video (moving pictures) and audio into a predetermined digital data format (coding processing). More specifically, coding processing such as coding according to Moving Picture Experts Group (MPEG) or H.264 is performed for the captured video data and audio data to convert (compress) them into the predetermined data format. When the captured data is reproduced, the compression/decompression circuit 212 performs data processing including decompression of the video data (moving picture data) in the predetermined data format and display of the resulting data on the display 209 or the like. It should be noted that the compression/decompression circuit 212 may have a function of compressing and decompressing still pictures as well as moving pictures.

The ROM 213 holds a program of software processed by the CPU 204 and various data used for executing the program.

The RAM 214 is used as a memory region or the like which is used in execution of the program of the software processed by the CPU 204. The RAM 214 may be used not only for the CPU 204 but also for the compression/decompression circuit 212.

The HDD 215 is used, for example, to accumulate moving picture data coded by the compression/decompression circuit 212 and still picture data. The HDD 215 may hold not only the above data but also data of reproduction information, which will be described later, and the like. It should be noted that the HDD 215 has been described as a representative of a recording medium, but the recording medium may be a semiconductor recording device.

The audio ADC 216 converts audio provided from the microphone 217 from analog electrical signals to digital electrical signals.

The microphone 217 converts audio provided from the outside of the camcorder 100 into electrical signals.

It should be noted that the hardware structure of the camcorder 100 has been described as above, but the present invention is not limited to the above structure. For example, each of the moving picture ADC 202, the moving picture signal conversion circuit 203, and the like can be implemented as a single integrated circuit. In addition, a part of a software program executed by the CPU 204 may be implemented as a separate hardware using a Field Programmable Gate Array (FPGA).

Figure 3A:
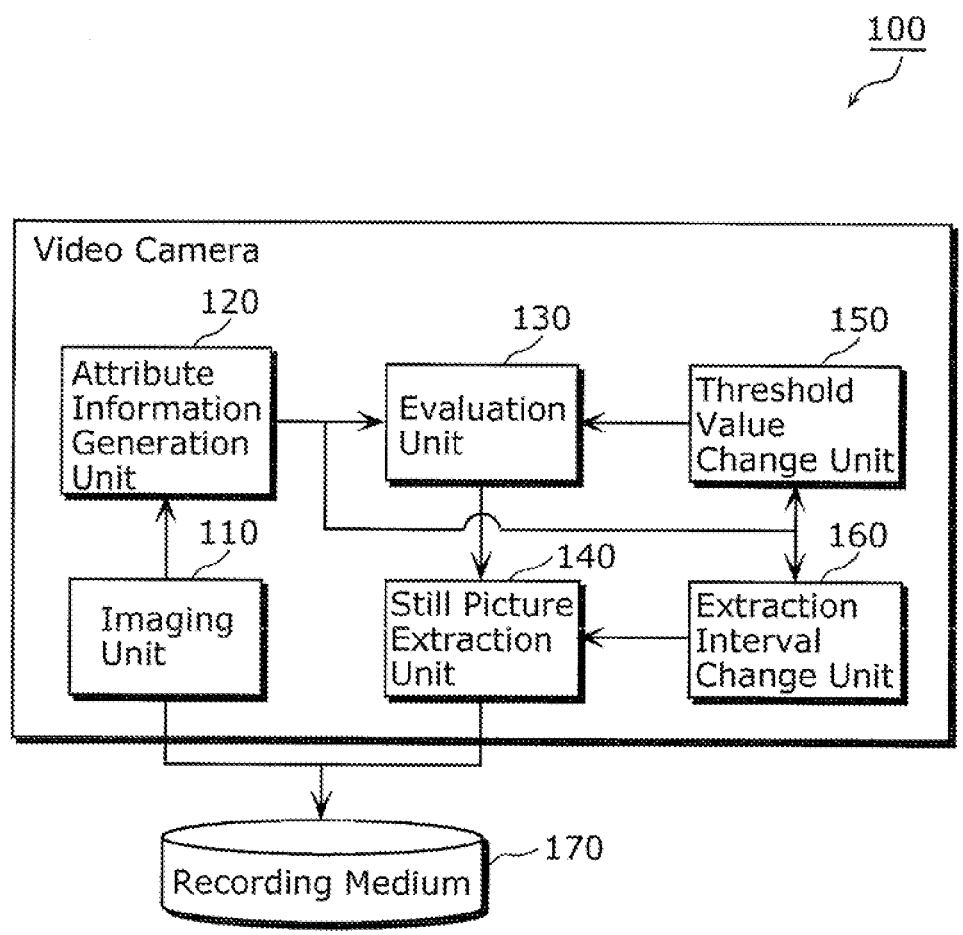
FIG. 3A is a functional block diagram of the inside of the camcorder according to the embodiment of the present invention.

Next, a functional structure of the camcorder 100 is described with reference to FIGS. 3A and 3B. FIG. 3A is a block diagram illustrating an example of the functional structure of the camcorder 100.

As illustrated in FIG. 3A, the camcorder 100 includes an imaging unit 110, an attribute information generation unit 120, an evaluation unit 130, a still picture extraction unit 140, a threshold value change unit 150, and an extraction interval change unit 160.

The imaging unit 110 captures moving pictures. The captured moving pictures are provided to the attribute information generation unit 120 and the still picture extraction unit 140, and also recorded onto the recording medium 170. The imaging unit 110 corresponds to a set of the lens group 200, the imaging device 201, the moving picture ADC 202, the moving picture signal conversion circuit 203, and the like illustrated in FIG. 2.

The attribute information generation unit 120 generates attribute information that indicates features of the moving pictures captured by the imaging unit 110. The generated attribute information is provided to the evaluation unit 130, the threshold value change unit 150, and the extraction interval change unit 160. The attribute information generation unit 120 is implemented as one of control algorithms processed by the CPU 204 illustrated in FIG. 2.

The evaluation unit 130 applies the attribute information generated by the attribute information generation unit 120 to a predetermined evaluation criterion, so as to calculate an evaluation value of the moving pictures for each predetermined time width. The calculated evaluation value is provided to the still picture extraction unit 140. Here, the "predetermined time width" is, for example, a scene that will be described later, or a frame (referred to also as a "picture"). The evaluation unit 130 is implemented as one of control algorithms processed by the CPU 204 illustrated in FIG. 2.

The still picture extraction unit 140 previously holds an evaluation threshold value. The still picture extraction unit 140 compares the evaluation threshold value to the evaluation value calculated by the evaluation unit 130. Then, if the evaluation value exceeds the evaluation threshold value, the still picture extraction unit 140 extracts a still picture from a time width corresponding to the evaluation value among the moving pictures. The extracted still picture is recorded onto the recording medium 170. The still picture extraction unit 140 is implemented as one of control algorithms processed by the CPU 204 illustrated in FIG. 2.

The threshold value change unit 150 changes the evaluation threshold value held in the still picture extraction unit 140 based on the attribute information generated by the attribute information generation unit 120. More specifically, the threshold value change unit 150 changes the evaluation threshold value based on at least one of (a) person information for identifying a person included (photographed) in the moving pictures and (b) an amount of change in compositions among the moving pictures (hereinafter, referred to also as a "composition change amount"). The person information and the amount of change are included in the attribute information. The changed evaluation value is provided to the still picture extraction unit 140. The threshold value change unit 150 is implemented as one of control algorithms processed by the CPU 204 illustrated in FIG. 2. However, if the evaluation threshold value is a fixed value, the threshold value change unit 150 can be eliminated.

The extraction interval change unit 160 changes a minimum wait time designated in the still picture extraction unit 140 based on the attribute information generated by the attribute information generation unit 120. More specifically, the extraction interval change unit 160 changes the minimum wait time based on at least one of (a) person information for identifying a person included (photographed) in the moving pictures and (b) a composition change amount among the moving pictures. The person information and the amount of change are included in the attribute information. The changed minimum wait time is provided to the still picture extraction unit 140. The extraction interval change unit 160 is implemented as one of control algorithms processed by the CPU 204 illustrated in FIG. 2. However, if the minimum wait time is a fixed value, the extraction interval change unit 160 can be eliminated.

Here, the "minimum wait time" is a minimum value of an interval between extraction of a first still picture and extraction of a subsequent second still picture. This means that the still picture extraction unit 140 needs to extract the second still picture after at least the minimum wait time has been passed since the extraction of the first still picture.

The recording medium 170 holds the moving pictures captured by the imaging unit 110, the still picture(s) extracted by the still picture extraction unit 140, and the like. The recording medium 170 can also hold other various information necessary for the camcorder 100. The recording medium 170 corresponds to the ROM 213, the RAM 214, the HDD 215, or the memory card 218 connected to the output I/F 211 illustrated in FIG. 2.

Figure 3B:
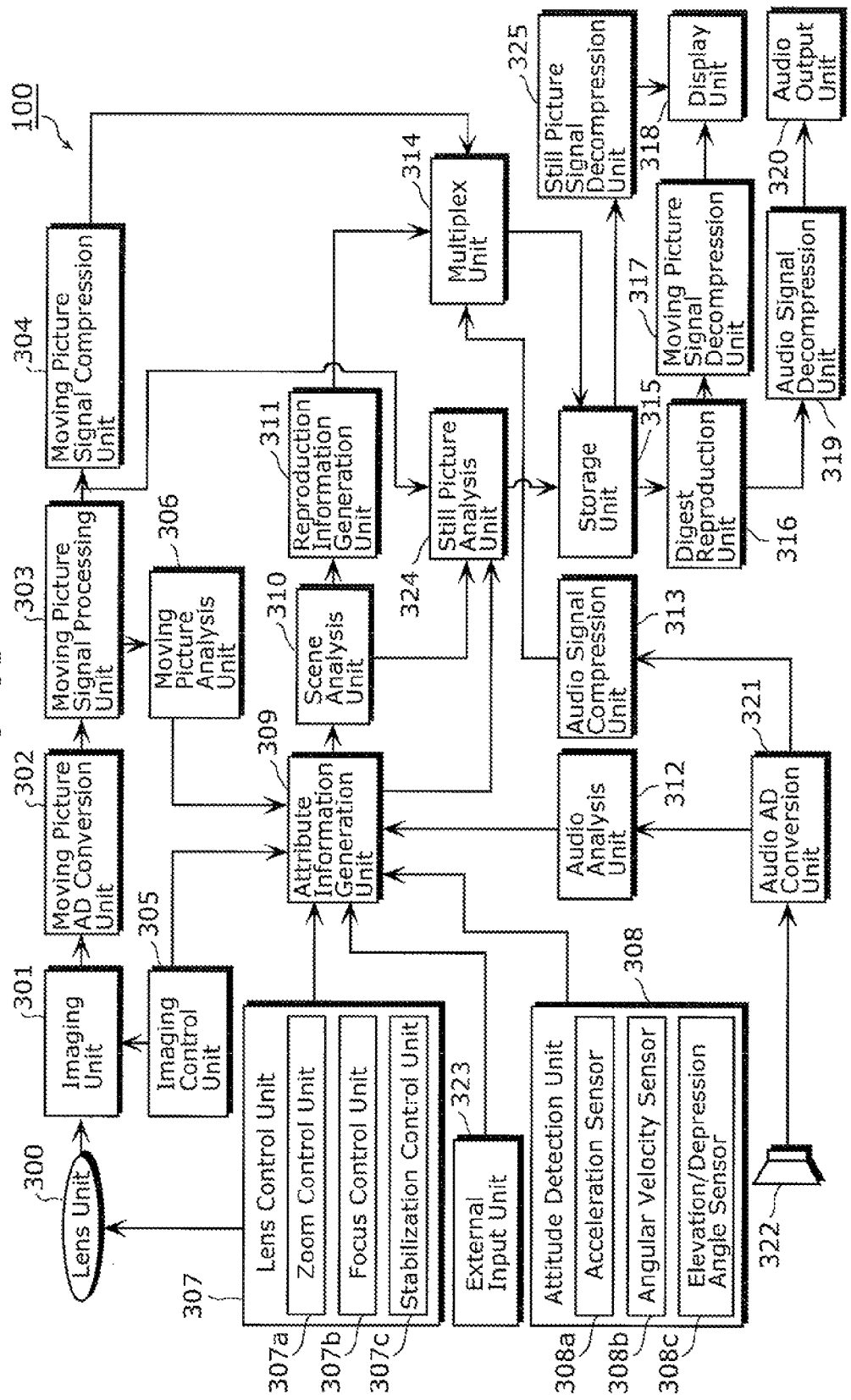
FIG. 3B is a functional block diagram of the further details of FIG. 3A.

FIG. 3B is a functional block diagram illustrating details of the camcorder 100.

As illustrated in FIG. 3B, the camcorder 100 includes functional structural elements which are a lens unit 300, an imaging unit 301, a moving picture AD conversion unit 302, a moving picture signal processing unit 303, a moving picture signal compression unit 304, an imaging control unit 305, a moving picture analysis unit 306, a lens control unit 307, an attitude detection unit 308, an attribute information generation unit 309, a scene analysis unit 310, a reproduction information generation unit 311, an audio analysis unit 312, an audio signal compression unit 313, a multiplex unit 314, a storage unit 315, a digest reproduction unit 316, a moving picture signal decompression unit 317, a display unit 318, an audio signal decompression unit 319, an audio output unit 320, an audio AD conversion unit 321, a microphone unit 322, an external input unit 323, a still picture analysis unit 324, and a still picture signal decompression unit 325.

The lens unit 300 adjusts a focal point distance of light incident from an object, a zoom magnification (magnification of moving pictures), and the like The adjustment is performed under the control of the lens control unit 307. The lens unit 300 corresponds to the lens group 200 illustrated in FIG. 2.

The imaging unit 301 converts light incident through the lens unit 300 into electrical signals. The imaging unit 301 generates data in a desired range of the imaging device, under the control of the imaging control unit 305. The imaging unit 301 can generate not only the above-mentioned moving picture data, but also chromaticity spatial information of three primary color points, coordinates of white color, gain information of at least two of the three primary colors, color temperature information, Δuv (delta uv), gamma information of three primary colors or luminance signals, and the like. These pieces of information are provided to the attribute information generation unit 309. The imaging unit 301 corresponds to the imaging device 201 illustrated in FIG. 2.

The moving picture AD conversion unit 302 converts the electrical signals provided from the imaging unit 301, from analog signals to digital signals by predetermined processes. The moving picture AD conversion unit 302 corresponds to the moving picture ADC 202 illustrated in FIG. 2.

The moving picture signal processing unit 303 converts the digital signals provided from the moving picture AD conversion unit 302, into a predetermined moving picture signal format. For example, the moving picture signal processing unit 303 converts the digital signals into moving picture signals compliant to the number of horizontal lines, the number of scan lines, and a frame rate which are defined in NTSC. The moving picture signal processing unit 303 corresponds to the moving picture signal conversion circuit 203 illustrated in FIG. 2.

The moving picture signal compression unit 304 performs predetermined coding-conversion for the digital signals generated by the moving picture signal processing unit 303, thereby compressing a data amount, for example. For example, the moving picture signal compression unit 304 employs a coding method such as MPEG-2, MPEG-4, or H.264. The moving picture signal compression unit 304 corresponds to the compression function of the compression/decompression circuit 212 illustrated in FIG. 2.

The imaging control unit 305 controls operations of the imaging unit 301. More specifically, the imaging control unit 305 controls an exposure in capturing, a capturing speed, a sensitivity, and the like of the imaging unit 301. These pieces of control information are provided also to the attribute information generation unit 309. The imaging control unit 305 is implemented as one of control algorithms processed by the CPU 204 illustrated in FIG. 2.

The moving picture analysis unit 306 extracts features of the captured moving pictures from the signals of the moving pictures. In the first embodiment, when a human face is detected from color information (for example, color distribution in the moving pictures is detected), color balance, and the moving pictures, the moving picture signals are analyzed to extract features of the moving pictures to detect the face, for example. The color distribution detection can be achieved by checking color information included in the data constituting the moving picture signals. The face detection can be achieved by pattern matching processing or the like. The moving picture analysis unit 306 can be implemented as one of control algorithms processed by the CPU 204 illustrated in FIG. 2.

The lens control unit 307 controls operations of the lens unit 300. The lens control unit 307 includes a zoom control unit 307a, a focus control unit 307b, a stabilization control unit 307c, and the like.

The zoom control unit 307a controls a zoom lens of the lens unit 300 in order to magnify the light from an object by a desired magnification ratio to be incident on the imaging unit 301. The focus control unit 307b controls a focus lens of the lens unit 300 to set a focal point distance between the object and the imaging unit 301. The stabilization control unit 307c suppresses blur caused by the image capturing device capturing moving pictures or the like. The lens control unit 307 controls the lens unit 300 and provides information for the control (control information) to the attribute information generation unit 309. The lens control unit 307 corresponds to the lens control module 206 illustrated in FIG. 2.

The attitude detection unit 308 detects an acceleration, an angular velocity, an elevation angle, a depression angle, and the like of the camcorder 100. The attitude detection unit 308 includes an acceleration sensor 308a, an angular velocity sensor 308b, and an elevation/depression angle sensor 308c. These sensors are used to detect an attitude of the camcorder 100 and a change sate of the attitude, for example. It is desirable that the acceleration and the angular velocity can be detected in three directions including vertical and horizontal directions (two directions). The attitude detection unit 308 corresponds to the attitude detection sensor 207 illustrated in FIG. 2.

The microphone unit 322 converts ambient sound into electrical signals to generate audio signals. The microphone unit 322 corresponds to the microphone 217 illustrated in FIG. 2.

The audio AD conversion unit 321 converts the analog electrical signals provided from the microphone unit 322 into digital electrical signals. The audio AD conversion unit 321 corresponds to the audio ADC 216 illustrated in FIG. 2.

The audio analysis unit 312 extracts sound having a feature from the audio data converted into electrical signals. Here, examples of the sound having a feature are voice of the user, pronunciation of certain words, cheers, gunshots, and the like. For identification of these sounds, for example, a unique frequency of each sound (voice) is previously registered and later used to be compared with a target frequency to identify the sound. Thereby, the sound can be extracted. Besides the above, the audio analysis unit 312 also detects a feature, such as an input level, of the sound caught by the microphone unit 322. The audio analysis unit 312 can be implemented as one of control algorithms processed by the CPU 204 illustrated in FIG. 2.

The audio signal compression unit 313 converts the audio data provided from the audio AD conversion unit 321 using a predetermined coding algorithm. The coding algorithm may be MPEG Audio Layer-3 (MP3), Advanced Audio Coding (AAC), and the like. The audio signal compression unit 313 can be implemented as one of compression functions of the compression/decompression circuit 212 illustrated in FIG. 2.

The external input unit 323 provides the image capturing device with various information received from the outside when capturing moving pictures. Examples of the various information are button entry by the user, capturing index information received via communication from the outside, and the like. The capturing index information is, for example, an identification number for identifying each capturing process, such as a number for identifying a captured shot in capturing video or a number indicating the number of capturing processes. The external input unit 323 corresponds to the input button 208 illustrated in FIG. 2 and the like.

The attribute information generation unit 309 generates, as attribute information (metadata), capturing information regarding capturing of moving pictures and still picture(s), external input information, and other information. Examples of information included in the attribute information are as follows.

focal point distance
zoom magnification
exposure
capturing speed
sensitivity
color spatial information of three primary colors
color balance
gain information of at least two of three primary colors
color temperature information
$\Delta uv$ (delta uv)
gamma information of three primary colors or luminance signals
color distribution
person information (face recognition information)
camera attitude (acceleration, angular velocity, elevation angle, depression angle, etc.)
capturing time (capturing start time, capturing end time)
capturing index information
user entry
frame rate
sampling frequency
composition change amount The attribute information further includes new information characterizing a moving picture scene. The new information is calculated from the above various pieces of information obtained in capturing moving pictures. For instance, the new information is generated by combining the above pieces of information and analyzing them. For example, camera work information, such as pan and tilt, can be generated from the camera attitude information (acceleration, angular velocity, elevation angle, depression angle, etc.) obtained when the camcorder 100 captures moving pictures. The focal point distance information and the zoom magnification information can be used directly as the attribute information. The attribute information generation unit 309 generates the attribute information by extracting or calculating pieces of information, which are useful in scene evaluation, from the various pieces of information obtained in capturing moving pictures.

The scene analysis unit 310 evaluates each scene based on the attribute information generated by the attribute information generation unit 309. Then, based on a result of the evaluation, a scene to be reproduced is selected. Methods for evaluating and selecting a scene will be described in detail later.

The reproduction information generation unit 311 generates, as reproduction information, the scene selected by the scene analysis unit 310 to be reproduced. The generation of the reproduction information will also be described later.

Each of the attribute information generation unit 309, the scene analysis unit 310, and the reproduction information generation unit 311 is one of algorithms of software processing executed by the CPU 204 illustrated in FIG. 2.

The multiplex unit 314 multiplexes: coded moving picture data generated by the moving picture signal compression unit 304; coded audio data generated by the audio signal compression unit 313; reproduction information generated by the reproduction information generation unit 311; and the like. The multiplex unit 314 may be software executed by the CPU 204 illustrated in FIG. 2, or may be hardware processed by the compression/decompression circuit 212.

The storage unit 315 holds, temporarily or for a long time, the data generated by the multiplex unit 314 by multiplexing the coded moving picture data, the coded audio data, and the reproduction information, as well as data of still picture(s) and the like. The storage unit 315 corresponds to the HDD 215, the RAM 214, the memory card 218, or the like illustrated in FIG. 2.

The digest reproduction unit 316 reads out the multiplexed data from the storage unit 315, and extracts the reproduction information from the multiplexed data. Then, based on the reproduction information, the digest reproduction unit 316 causes the moving picture data to be decoded by the moving picture signal decompression unit 317 and then outputted by the display unit 318, and also caused the audio data to be decoded by the audio signal decompression unit 319 and then outputted by the audio output unit 320. The digest reproduction unit 316 is one of algorithms of software processing executed by the CPU 204 illustrated in FIG. 2.

Based on the information generated by the attribute information generation unit 309, the scene information analyzed by the scene analysis unit 310, or the like, the still picture analysis unit 324 extracts, as a still picture, an appropriate frame from captured moving pictures. The extraction method and the like will be described in detail later. Processing such as image compression is performed on the extracted still picture, as needed. Then, the processed still picture is stored into the storage unit 315. The still picture analysis unit 324 is one of algorithms of software processing executed by the CPU 204 illustrated in FIG. 2.

The still picture signal decompression unit 325 reads data of the still picture from the storage unit 315 and displays the data on the display unit 318. Here, the still picture stored in the storage unit 315 is not necessary to be data processed by image compression or the like. The still picture signal decompression unit 325 corresponds to the decompression function of the compression/decompression circuit 212 illustrated in FIG. 2.

With the above structure, the camcorder 100 can automatically extract an appropriate scene from captured moving pictures based on attribute information, and reproduce only the scene, for example.

The imaging unit 110 illustrated in FIG. 3A corresponds to, for example, a set of the lens unit 300, the imaging unit 301, the moving picture AD conversion unit 302, and the moving picture signal processing unit 303 which are illustrated in FIG. 3B. The attribute information generation unit 102 corresponds to, for example, the attribute information generation unit 309. The evaluation unit 130 corresponds to, for example, the scene analysis unit 310. A set of the still picture extraction unit 140, the threshold value change unit 150, and the extraction interval change unit 160 corresponds to, for example, the still picture analysis unit 324. The recording medium 170 corresponds to, for example, the storage unit 315. However, the present invention is not limited to the above-described correspondence relationships.

It should be noted that the hardware block diagram of FIG. 2 and the functional block diagrams of FIGS. 3A and 3B show an example of implementation of the present invention. The present invention is not limited to the above. For example, in FIG. 3B, the scene analysis unit 310 and the reproduction information generation unit 311 perform their processes prior to storing data into the storage unit 315. However, it is also possible that the scene analysis unit 310 and the reproduction information generation unit 311 multiplex compressed moving picture signals, compressed audio signals, and attribute information regarding capturing of moving pictures, then temporarily store the multiplexed data into the storage unit 315, and then read the data from the storage unit 315 to perform the scene analysis and the reproduction information generation.

It should also be noted that the correspondence relationship between the hardware block diagram of FIG. 2 and the functional block diagrams of FIGS. 3A and 3B are not limited to the above. The above description is merely an example of implementation of the present invention. The relationship between the functional structure and the hardware structure may be different from the above.

<2. Captured Scene Analysis and Reproduction Information Generation>

Figure 4:
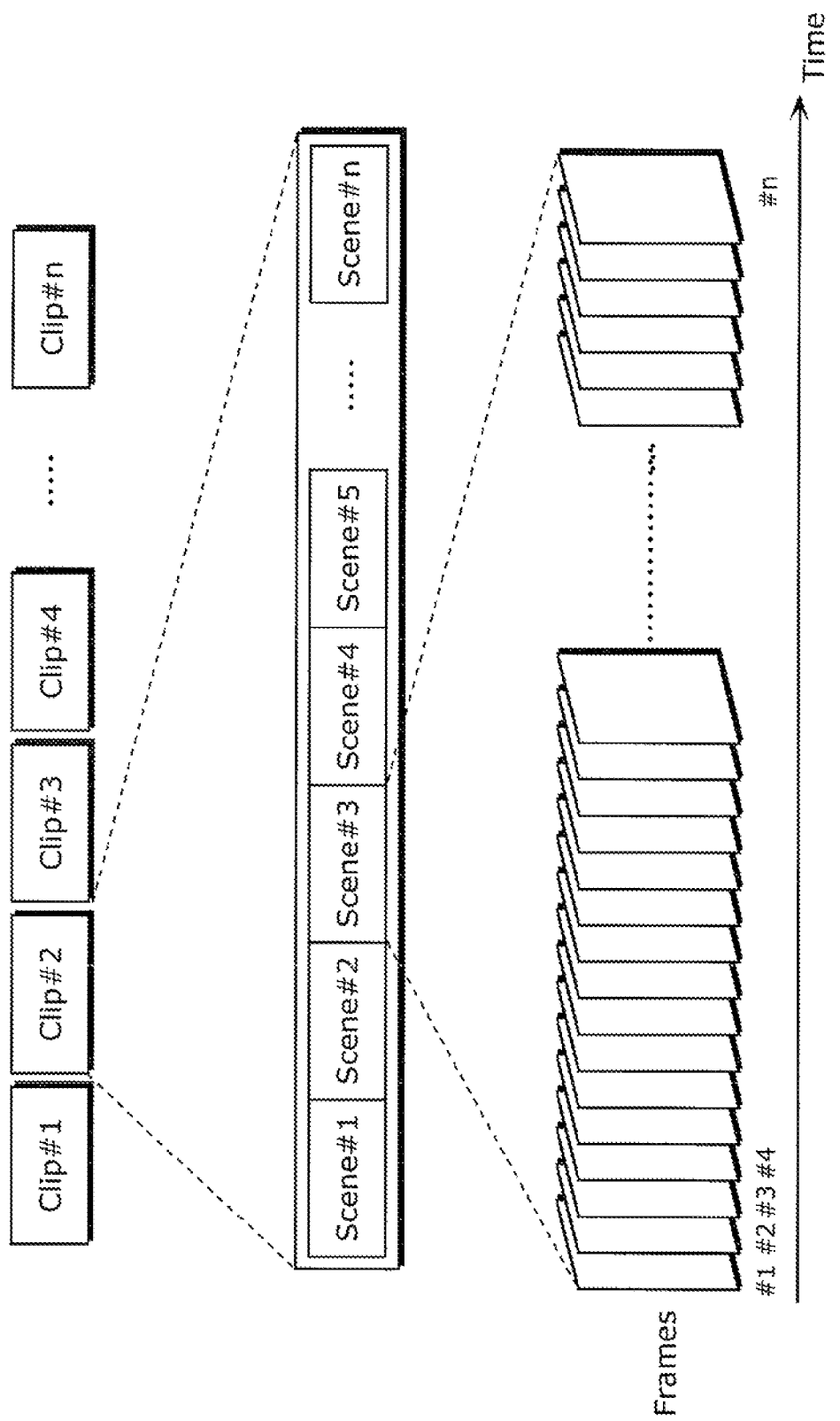
FIG. 4 is a relationship diagram of clips, scenes, and frames of captured video (moving pictures) captured according to the embodiment of the present invention.

FIG. 4 is a diagram illustrating a structure of moving pictures captured by the camcorder 100. A unit of moving pictures which are captured during a period from a user's instruction to start capturing until a user's instruction to end or halt the capturing is referred to a "clip". Repetition of such user's instructions to start and end or halt capturing generates a plurality of clips. In the example of FIG. 4, clips are assigned with respective clip numbers (Clips #1 to #N).

One clip consists of one or more "scenes". The "scene" is a series of moving pictures which are logically related to one another. The scene can be arbitrarily designated. For example, one clip can be one scene so that "1 clip"="1 scene". Or, a boundary between "scenes" may be set at a timing where a screen image is significantly changed. In this case, the following is possible. The moving picture analysis unit 306 estimates a motion vector between frames. If a degree (change) of the "motion" is larger than a predetermined value, then a "scene" is switched to another between the pictures. It is also possible that a clip may be segmented into "scenes" based on other information such as the capturing information.

The scene analysis unit 310 may segment a clip into scenes based on other information such as the capturing information. For example, the scene analysis unit 310 may segment a clip into scenes based on entry of a button pressed by the user. In this case, the "clip" can consist of "scenes" according to clear intention of the user. If one clip includes a plurality of scenes, the scenes are assigned with respective scene numbers (Scenes #1 to #n) as illustrated in FIG. 4.

The "scene" consists of one or more "frames". The "frame" is each still picture included in moving pictures. As illustrated in FIG. 4, each frame is assigned with a frame number (Frame #1 to #n).

FIG. 5 is a table in the case where the scene analysis unit 310 segments a clip into a plurality of scenes. The scene analysis unit 310 performs the clip segmentation based on a capturing start time, a capturing end time, and the like included in the attribute information. In FIG. 5, each scene is defined using a "start time" and an "end time". However, the start and end of each scene may be defined by frame numbers and the like.

FIG. 6 is a table of evaluation criteria by which kinds of attribute information are associated with respective evaluation values. The evaluation criteria are used to evaluate respective scenes. For example, if a clip-in portion (a start portion of capturing processing) and a clip-out portion (an end portion of capturing processing) are considered as introduction parts or important parts of captured moving pictures, it is possible to suppose that the captured moving pictures have highly logical meaning. In the above case, an evaluation value associated with a "clip in (A)" and a "clip out (F)" is 100.

Moreover, each of a "zoom up (D)" and a "zoom down (G)" as camera works in capturing processing is associated with an evaluation value of 30, because such camera works increase an attention to a certain object. As described above, the scene analysis unit 310 previously has the evaluation criteria in which pieces of attribute information are associated with respective numeral evaluation values.

In FIG. 6, a higher evaluation value means higher evaluation (is more appropriate). The scene analysis unit 310 evaluates each of scenes based on respective relationships between pieces of attribute information and evaluation values in FIG. 6.

If one scene is assigned with plural pieces of attribute information, the scene analysis unit 310 may sum evaluation values assigned to the respective pieces of attribute information to generate an evaluation value of the scene. It is also possible that, if one scene is assigned with plural pieces of attribute information, the scene analysis unit 310 selects the highest evaluation value from the evaluation values of the pieces of attribute information to generate an evaluation value of the scene. It is still possible that the scene analysis unit 310 averages the evaluation values of the pieces of attribute information to generate an evaluation value of the scene. For further detailed evaluation, the scene analysis unit 310 may perform evaluation for each of frames in the scene.

The scene analysis unit 310 does not need to perform evaluation only for appropriate items (identifiers A to H and X to Z). For example, hand shake blur (I) arising in capturing would result in video which a viewer cannot perceive easily. For scenes having such an attribute, the evaluation may employ a demerit point (negative point) system. In the example of FIG. 6, an evaluation value associated with the "hand shake blur (I)" is −20, and an evaluation value associated with "capturing ground (in a vertical and downward direction) (J)" is −10.

A relationship between a piece of attribute information and an evaluation value in FIG. 6 is necessarily fixed. For example, plural patterns of a combination of a kind of attribute information and an evaluation value are prepared. Then, the patterns are switched according to a capturing mode employed by the user of the evaluation value 100. Examples of the capturing mode are a mode for capturing scenery, a mode for capturing a person (portrait), a mode for capturing a still object, and the like. It is also possible to prepare a plurality of combinations of data, and synthesize the plurality of combination data (by summing respective evaluation values by a certain ratio) according to a capturing mode. In the above case, the combination data of attribute information and an evaluation value can be dynamically changed by changing a combination ratio.

It is also possible that the user changes an item (kind) of attribute information and an evaluation value by using the external input unit 323 or the like. Thereby, the user can increase an evaluation value for an attribute which the user regards more important. As a result, the scene analysis unit 310 can perform evaluation which reflects the user's intention much more.

Figure 7:
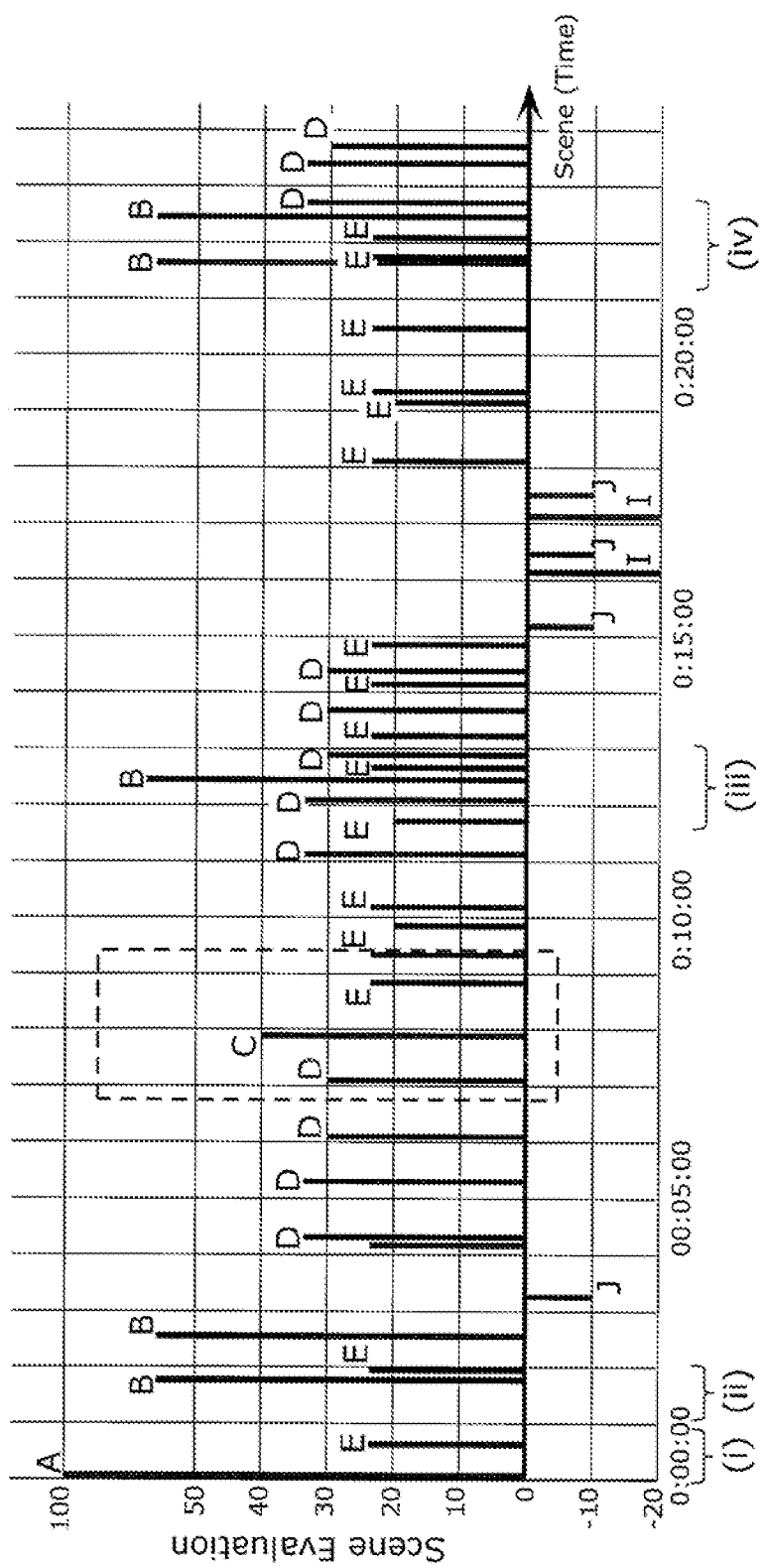
FIG. 7 is a graph plotting a result of allocating an evaluation value to each scene according to the embodiment of the present invention.

FIG. 7 is a graph plotting a result when the scene analysis unit 310 assigns evaluation values to respective scenes. In FIG. 7, a horizontal axis represents a time (scenes) and a vertical axis represents evaluation values of respective scenes. Moreover, in FIG. 7, a scene having an evaluation value from 80 to 100 is represented by "A", a scene having an evaluation value from 50 to 79 is represented by "B", a scene having an evaluation value from 35 to 49 is represented by "C", a scene having an evaluation value from 26 to 34 is represented by "D", a scene having an evaluation value from 0 to 25 is represented by "E", a scene having an evaluation value from −1 to −10 is represented by "J", and a scene having an evaluation value of −11 or less is represented by "I".

A scene assigned with the reference "A" near a time 0 in FIG. 7 has an attribute "clip in (A)", because the scene is immediately after start of capturing processing. According to FIG. 6, an evaluation value of the attribute information "clip in (A)" is 100.

Each scene assigned with the reference "B" has an attribute "extraction of certain audio (B)". The extraction of certain audio is performed by the audio analysis unit 312 and the like. According to FIG. 6, an evaluation value of the attribute information "extraction of certain audio (B)" is 70.

The scene assigned with the reference "C" has an attribute "capturing still (after camera work) (C)" that means the user captures pictures by moving the camcorder 100 as pan and tilt, and then captures pictures by fixing the camcorder 100 still. Therefore, such a scene results in determination that an object, which is captured still in the scene, has high evaluation. According to FIG. 6, an evaluation value of the attribute information "capturing still (after camera work) (C)" is 40.

Each scene assigned with the reference "D" is captured by, for example, zooming up or down the camcorder. According to FIG. 6, each evaluation value of the attributes "zoom up (D)" and "zoom down (E)" is 30.

However, the zoom-up attribute and the zoom-down attribute may have different evaluation values. For example, the evaluation value of the zoom-up attribute may be higher than the evaluation value of the zoom-down attribute. Thereby, a relatively high evaluation value may be assigned to a scene captured by zooming up, namely, a scene with gradually increasing magnification of moving pictures (a scene having a magnified captured object). On the other hand, a relatively low evaluation value may be assigned to a scene with gradually decreasing magnification of moving pictures.

Each scene assigned with the reference "E" is captured with a movement (camera work) in the camcorder 100, such as "pan, tilt (E)". According to FIG. 6, an evaluation value of the attribute information "pan, tilt (E)" is 25.

Each scene assigned with the reference "I" is captured with "hand shake blur (I)". Since a viewer of the moving pictures would have a difficulty in perceiving such a scene due to blur and the like on images, an evaluation value of the attribute is a demerit point. According to FIG. 6, the evaluation value of the attribute information "hand shake blur" is −20.

The scene assigned with the reference "J" is, for example, a scene generated by "capturing ground (in a vertical and downward direction)". such a scene is likely to occur when, for example, the user moves holding the camcorder without stopping or halting the capturing by mistake. According to FIG. 6,luation value of the attribute information "capturing ground (in a vertical and downward direction)" is −10.

The similar errors in capturing are low illumination, back illumination, out of focus, bright-area-gradation deterioration, dark-area-gradation deterioration, and the like in capturing. These capturing errors can be represented by negative evaluation values in the same manner as described for the hand shake blur attribute and the ground capturing attribute. As described above, it is possible that attribute information (successful capturing) for increasing a value of captured image is associated with a positive evaluation value, and that attribute information (error capturing) for decreasing a value of captured image is associated with a negative evaluation value.

In the above-described scene evaluation, evaluation values associated with all pieces of attribute information (of successful capturing and error capturing) regarding each scene are summed up. Then, the sum is compared to an evaluation threshold value. If the sum exceeds the evaluation threshold value, then a still picture is extracted from the scene.

As described above, the scene analysis unit 310 assigns an evaluation value to each scene. It should be noted that an evaluation value is assigned to each scene in the example of FIG. 7, but the scene analysis unit 310 may assign an evaluation value to each clip or each frame.

The scene analysis unit 310 extracts only appropriate scene(s) from evaluated scenes based on the respective evaluation values. More specifically, from evaluated scenes, the scene analysis unit 310 extracts only scenes each having a high evaluation value exceeding a predetermined threshold value (evaluation threshold value). For example, in FIG. 7, if the evaluation threshold value is 50, only scenes (i) to (iV) each having an evaluation value higher than the evaluation threshold value are extracted.

The extraction method is not limited to the above. The extraction method may be combined with other methods to perform the extraction from various viewpoints. For example, the extraction can be performed based on whether or not a total reproduction time period of the extracted scenes is within a predetermined time period. Or, the extraction can be performed based on whether or not evaluation values of the scenes are steady.

According to the scenes extracted from the scene analysis unit 310, the reproduction information generation unit 311 generates reproduction information indicating a procedure and a method for reproducing moving pictures in the scene. The reproduction information is, for example, indicated by a start time and an end time of the scene to be reproduced, as indicated in FIG. 8. In this case, a "representative time" or the like can be also indicated in the reproduction information. Thereby, it is possible to specify a representative still picture in the scene (namely, a still picture having the highest evaluation in the scene, for example). As a result, an image for reference can be easily searched out.

There is another possible method (hereinafter, as a "scene specification method") by which an extracted scene is specified according to a method of managing moving pictures stored in the storage unit 315. More specifically, if, for example, scenes are stored in respective files in the storage unit 315, it is possible to specify a file to select and reproduce only a certain scene.

It should be noted that the management of the reproduction information is not limited to the above but may be other methods. For example, the scene specification method may be indicated by frame numbers. Furthermore, if the reproduction information generated by the reproduction information generation unit 311 is multiplexed by the multiplex unit 314 to be a Transport Stream (TS) according to MPEG or the like, it is possible to record the reproduction information using time information employed in the multiplexing, such as a Presentation Time Stamp (PTS) and a Decoding Time Stamp (DTS). In the case of H.264, predetermined time information employed in the multiplexing can also be used.

Moreover, if moving picture data is recorded according to a standard such as Advanced Video Codec High Definition (AVCHD) used as a data recording method for some types of camcorders, the reproduction information may be recorded in a Play List file, for example.

As described above, it is possible to automatically generate digest moving pictures (digest video) from captured moving pictures.

<3. Still Picture Automatic Extraction>
<3.1 Use of Evaluation of Moving Pictures for Each Scene>

The still picture analysis unit 324 obtains evaluation values of respective scenes from the scene analysis unit 310. Then, the still picture analysis unit 324 determines a target still picture(s) in the scenes based on the evaluation values.

First, the still picture analysis unit 324 obtains evaluation values seen in FIG. 7 which are generated by the scene analysis unit 310 for respective scenes. Next, based on the evaluation results of the scenes, the still picture analysis unit 324 selects, as target scenes for still picture extraction, scenes each having an evaluation value exceeding the evaluation threshold value. In the example of FIG. 7, assuming that target scenes need to have an evaluation value of 50 or higher, the scenes assigned with the references "A" and "B" are selected. Therefore, the still picture analysis unit 324 determines frames assigned with the references "A" and "B" from the target scenes, and extracts the determined pictures as still pictures.

When a still picture is extracted from a scene, the extracted still picture may be a picture representing the scene (namely, a still picture specified using a "representative time" in FIG. 5 and FIG. 8. The extracted still picture may also be a frame having a relatively small movement of the camcorder in capturing the scene. In the above case, since the movement of the camcorder in capturing the scene is small, the extracted still picture has relatively small hand shake blur. The still picture analysis unit 324 stores such an extracted still picture into the storage unit 315 as still picture data.

Here, the still picture analysis unit 324 can extract data of a still picture (still picture data) from the data generated by the moving picture signal processing unit 303 or from the data generated by the moving picture signal compression unit 304. However, if still picture data is extracted from moving picture data coded by the moving picture signal compression unit 304, there is a possibility that a part of the data (data related to image) has been deleted during the coding processing. Therefore, it is preferable that still picture data is extracted from the data generated by the moving picture signal processing unit 303 prior to coding processing.

Moreover, the still picture analysis unit 324 may compress the extracted still picture data using a still picture compression technology such as Joint Photographics Experts Group (JPEG), and then store the compressed data into the storage unit 315. An amount of the compressed data is smaller than an amount of non-compressed data. Therefore, the still picture data can be stored into the storage unit 315 at a relatively high speed.

The still picture signal decompression unit 325 reads the still picture data from the storage unit 315 and provides the data to the display unit 318. If the still picture data is compressed by JPEG or the like, the data is decompressed before being provided to the display unit 318.

With the structure described in the first embodiment, the camcorder 100 evaluates each scene during or after capturing of moving pictures. Then, using a result of the evaluation, it is possible to generate divest reproduction information and to automatically extract an appropriate still picture.

<3.2 Use of Evaluation Independent from Evaluation of Moving Pictures for Each Scene>

In the previous example, the evaluation of each scene for generating a digest video and the evaluation for extracting a still picture are performed based on the same evaluation criteria. However, since moving pictures and still pictures have different characteristics, they would be evaluated based on different evaluation criteria. For example, a digest video (moving pictures) would be recorded together with audio data. On the other hand, still pictures would be recorded without audio data. Therefore, moving pictures and the still pictures have different values for audio data.

Therefore, the still picture analysis unit 324 according to the first embodiment employs relationships between kinds of attributes and evaluation values as indicated in FIG. 9. In this example, the evaluation value of the attribute information "extraction of certain audio (B)" significantly differs between FIG. 6 (70 points) for the scene evaluation and FIG. 9 (10 points).

Moreover, moving pictures are likely to be captured by moving the camcorder. On the other hand, for still pictures, blur or the like occurred on capturing would be appropriate less than that in moving pictures. From the above viewpoints, the evaluation value of the attribute information "capturing still (after camera work)" significantly differs between FIG. 6 (40 points) and FIG. 9 (80 points). Likewise, the evaluation value of the attribute information "zoom up (D)" significantly differs between FIG. 6 (30 points) and FIG. 9 (40 points). The evaluation value of the attribute information "pan, tilt (E)" also significantly differs between FIG. 6 (25 points) and FIG. 9 (5 points).

Figure 10:
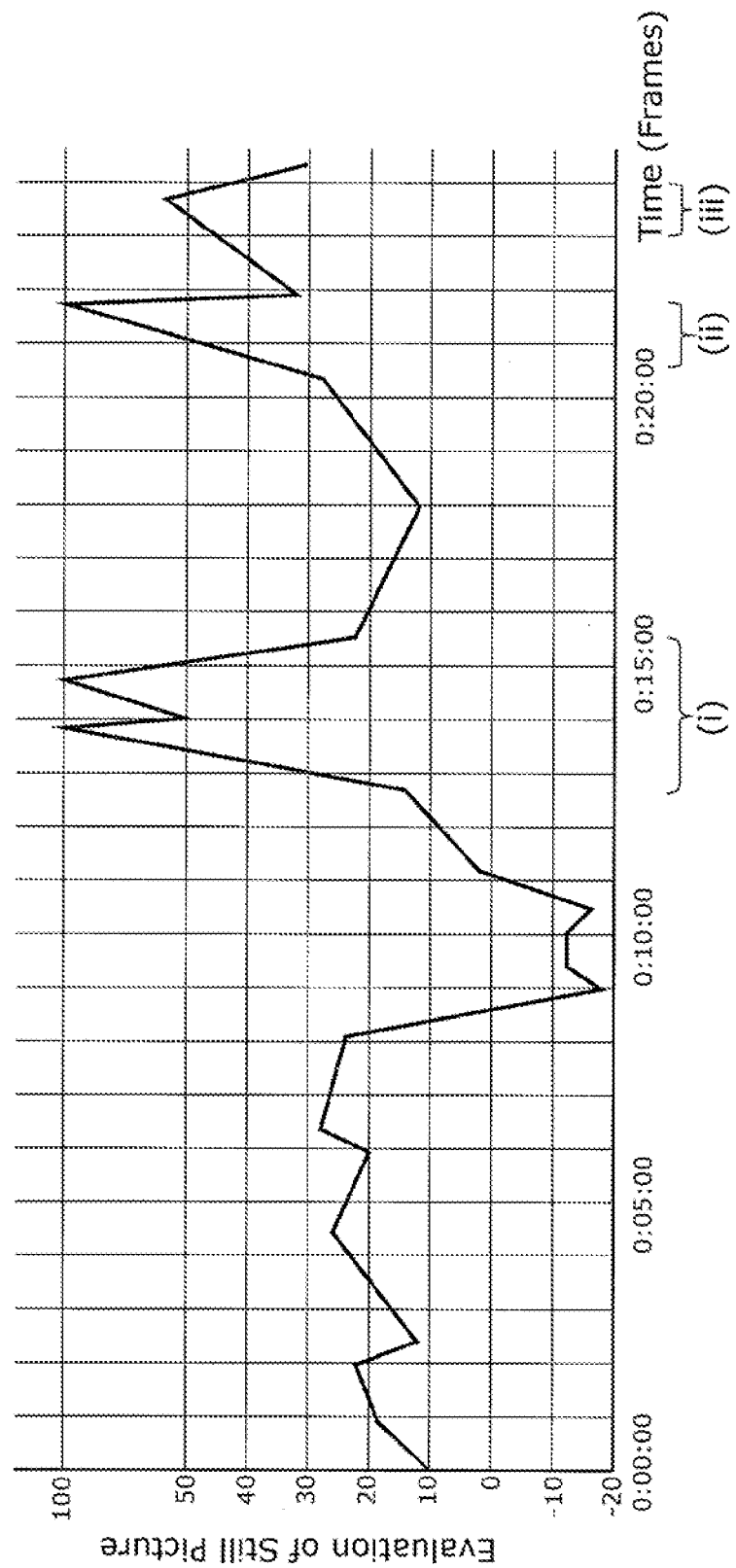
FIG. 10 is a graph of evaluation of frames captured in terms of the still picture extraction according to the embodiment of the present invention.

Like in FIG. 7, the still picture analysis unit 324 analyzes each of captured moving pictures, based on the evaluation criteria for the still picture extraction which is presented in FIG. 9. FIG. 10 is one example of the picture analysis. FIG. 10 is a graph plotting evaluation values of respective frames which are arranged in a time order. The evaluation values are generated based on the pieces of attribute information. Then, the still picture analysis unit 324 extracts appropriate still pictures from the pictures, based on the evaluation for the still picture extraction which is presented in FIG. 10.

In FIG. 10, assuming that the still picture analysis unit 324 extracts a still picture from a scene having an evaluation value higher than 45, target scenes from which still pictures are to be extracted are a section (i) between 0:13:30 and 0:15:20, a section (ii) between 0:20:50 to 0:21:50, and a section (iii) between 0:23:00 to 0:23:45. In this example, the still picture analysis unit 324 extracts a still picture from each of the sections.

For example, if a still picture is extracted from the section (i) between 0:13:30 and 0:15:20, the still picture analysis unit 324 performs the evaluation presented in FIG. 10 together with the capturing of moving pictures. In this case, the still picture analysis unit 324 detects that an evaluation value starts increasing from around a time 0:10:00, then reaches a first peak at a time 0:13:45, and then is decreased towards a time 0:14:00. Therefore, from the moving pictures, the still picture analysis unit 324 extracts a still picture at a time where the evaluation value becomes higher than a predetermined value (45 in this example) and a variation rate (increasing rate) of the evaluation value becomes lower than a certain degree.

From the moving pictures, the still picture analysis unit 324 extracts a still picture at a time 0:13:45 where the evaluation value reaches the first peak. Thereby, in the evaluation value graph of FIG. 10, it is possible to extract, as an appropriate picture, a still picture close to the fist peak.

Here, in the section (i) between 0:13:30 and 0:15:20, the evaluation value is increased again around at a time 0:14:40 after the time 0:13:45 to reach the second peak. In this case, the still picture analysis unit 324 may extract another still picture from the moving pictures, at around a time 0:14:45.

<3.3 Exception of Still Picture Automatic Extraction>

In the example of FIG. 10, in the section (i) between 0:13:30 and 0:15:20, the still picture extracted at around the time 0:13:45 and the still picture extracted at around the time 0:14:45 probably belong to the same scene. In other words, the still picture extraction using only evaluation values sometimes results in generation of similar still pictures in compositions of their objects, backgrounds, and angles of view. In short, the extracted still pictures are similar pictures. Such extraction of similar still pictures is not convenient, even if these pictures have high evaluation values designated by the still picture analysis unit 324.

In order to solve the problem, the still picture analysis unit 324 according to the first embodiment calculates a similarity between the first still picture, which is firstly extracted as a still picture and stored into the storage unit 315, and the second still picture, which is extracted after the first still picture. Then, based on the calculated similarity, only one of the first and second still pictures may be selected to be stored into the storage unit 315.

In this case, for example, the still picture analysis unit 324 compares (i) kinds of attribute information regarding the first still picture to (ii) kinds of attribute information regarding the second still picture. Here, the kinds of attribute information are used as determination criteria in the evaluation of FIG. 10. Thereby, the still picture analysis unit 324 can analyze a similarity between these still pictures. If all of the pieces of attribute information are the same, these still pictures would not have a large difference. On the other hand, if the pieces of attribute information are significantly different, the images of these still pictures are probably significantly different. Therefore, such a similarity can be calculated using the pieces of attribute information employed as the determination criteria in the evaluation.

Furthermore, the still picture analysis unit 324 can compare images of these still pictures to each other. For example, luminance signals are extracted from images of both the still pictures, and then compared to each other. Thereby, it is possible to detect a degree of a change between the images.

In addition, a degree of a difference between the first still picture and the second still picture can be detected by comparing (i) a composition of the image of the first still picture to (ii) a composition of the image of the second still picture. For example, each image is previously partitioned in a predetermined grid pattern. Then, (i) image (pixel values) in each grid (block) in the first still picture is compared to (ii) image (pixel values) in each grid (block) in the second still picture. As a result, a composition change amount between the images can be detected.

In this case, pixel values of each grid in the first still picture are compared to pixel values of each grid in the second still picture, thereby calculating the number of grids in which the difference between pixels for the first still picture and the second still picture is equal to or greater than a predetermined number. Then, if the calculated number of grids is equal to or greater than a predetermined threshold value, it is determined that the compositions of the images are different between the first and second still pictures (namely, a similarity between them is low). Based on the determination, both the first and second still pictures are extracted.

The following method is also possible. Pixel values of the first still picture and pixel values of the second still picture are compared to each other for each grid. If the number of grids each having pixels that are different between the first and second still pictures and that are equal to or more than a predetermined number is equal to or greater than a threshold value, and at the same time, a time difference (the number of intervene frames) between the first and second still pictures is within a predetermined range, it is determined that the compositions of the images are different between the first and second still pictures. In short, as a temporal distance between the first and second still pictures is shorter, a smaller threshold value is set. As the temporal distance is longer, the greater threshold value is set.

It is also possible to analyze the similarity by comparing scenes including the still pictures. In this case, respective scenes including the first and second still pictures are specified. Then, a similarity can be calculated based on a difference between the specified scenes. The following is also possible. Here, it is assumed that a boundary between scenes is set at a timing where content of video is significantly changed. Under the assumption, if both the first and second still pictures are included in the same scene, one of them is extracted to be recorded. On the other hand, if the first and second still pictures are included in respective different scenes, both of them are extracted to be recorded.

Furthermore, the still picture analysis unit 324 can perform the analysis based on a difference in capturing times between the first and second still pictures. This is because a smaller difference in capturing times between the first and second still pictures probably results in a higher similarity in images between these pictures. For example, when a captured object and the camcorder 100 are not changed during capturing of moving pictures by the camcorder 100, the evaluation values are unlikely to vary. Therefore, the capturing times of the still pictures can also be used in the similarity calculation.

When an object is a human face, the above method can be developed to the following. The pieces of information such as a composition change amount, a capturing time difference, or the like are combined with a technology of recognizing a human face. The method using the recognition technology is described below.

The still picture analysis unit 324 can perform face detection and face recognition, as presented in FIG. 9. Here, the still picture analysis unit 324 recognizes a face of a person A from target captured image. The face of the person A is assumed to be previously registered. For example, information (face information) regarding the face of the person A is previously stored in the storage unit 315 or the like. Then, the still picture analysis unit 324 determines, based on the face information stored in the storage unit 315, whether or not the object captured in moving pictures is the person A.

Here, it is assumed, as presented in FIG. 9, that an evaluation value for the case where the person A is captured as an object is 100, an evaluation value for the case where a person B is captured as an object is 80, and an evaluation value for the case where any other non-registered person except the person A and the person B is captured as an object is 40. Under the assumption, if the captured video includes the person A, the person B, and any other person, the evaluation value of the person A, which has the highest evaluation value among them, may be used.

In this case, the registered people A and B are considered as people (objects) whom the user of the camcorder 100 is highly interested in. It is therefore preferable that the automatic extraction of still picture is performed based on the user's interests. FIG. 11 is one example of the above. FIG. 11 is a table of examples of a minimum wait time determined based on (a) a person information for specifying a captured person, and (b) a composition change amount. The "minimum wait time" refers to a time period (occurrence frequency of capturing processing) during which the still picture analysis unit 324 should wait from extraction of the first still picture until extraction of the second still picture.

As presented in FIG. 11, if the face of the person A (with the highest evaluation value) is captured as an object and a composition change amount between the first and second still pictures is relatively large (larger than a predetermined amount), then the still picture analysis unit 324 designates 10 minutes for the minimum wait time between extraction of the still picture and extraction of the second still picture. Likewise, a minimum wait time is set to 30 minutes for a face of the person B, and 60 minutes for a face of any other person. On the other hand, if the composition change amount is relatively small (smaller than the predetermined amount), a minimum wait time is set to 60 minutes for a face of the person A, 120 minutes for a face of the person B, and 300 minutes for a face of any other person.

In short, the evaluation criteria presented in FIG. 9 are set so that capturing of a person having a higher evaluation value results in a shorter minimum wait time. In addition, a larger composition change amount can result in a shorter minimum wait time.

However, there is a problem when the still picture analysis unit 324 automatically extracts still pictures based on only the evaluation values presented in FIG. 9, for example, in the case where a composition change amount between the still pictures is relatively small. In this case, the extracted still pictures are similar images. Therefore, such still pictures with less diversity are not interesting enough. In the contrary case, if the still picture analysis unit 324 does not extract any still pictures because a composition change amount is small, there is another problem that still pictures are rarely generated even from a long capturing video.

In order to prevent the above problems, the still picture analysis unit 324 can change a temporal interval between extraction of still pictures, based on at least one of (a) a composition change amount and (b) a human face captured as an object (person information). Thereby, it is possible to increase still pictures when a face of a person more interesting for the user is captured, and to decrease still pictures when a face of a person less interesting for the user is captured. Based on a composition change amount, it is possible to generate various still pictures more, regarding a person the most interesting for the user.

The table of FIG. 11 does not limit the present invention. It is also possible to prepare various tables stored in the camcorder 100. Examples of the tables are a table for human capturing, a table for animal capturing, and the like. Such tables can be switched according to a capturing mode such as a mode for capturing humans, a mode for capturing moving objects, a mode fro macro capturing, or a mode for capturing scenery. This makes it possible to generate appropriate still pictures according to features of the object. Not only switching the tables, it is also possible to combine the tables to generate a single table to be used according to a capturing mode or the like.

It should be noted that it has been described with reference to FIG. 11 that, when the composition change amount is relatively small, minimum wait times are set to 60 minutes, 120 minutes, and 300 minutes for the face of the person A, the face of the person, and a face of any other person, respectively. The minimum wait times may be the fixed values, or may be dynamically changed. For example, minimum wait times between capturing of the first still picture and capturing of the second still picture are 60 minutes, 120 minutes, and 300 minutes for the person A, the person B, and any other person, respectively. In addition, minimum wait times between capturing of the second still picture and capturing of the third still picture are 120 minutes, 240 minutes, and 600 minutes for the person A, the person B, and any other person, respectively. In short, a minimum wait time is changed every time one still picture is extracted. This can suppress the generation of similar still pictures when images having similar compositions continue.

FIG. 12 is a graph of a relationship among the number of captured still pictures and a minimum wait time, when a composition change amount is kept equal to or smaller than a predetermined amount (namely, the composition is hardly changed). The solid line in FIG. 12 represents a temporal change of a minimum wait time when captured moving pictures include image of a person. Likewise, the broken line in FIG. 12 represents a temporal change of a minimum wait time when captured moving pictures do not include image of a person.

As obvious from FIG. 12, each of the minimum wait times represented by the solid line and the broken line is extended every time one still picture is extracted. Thereby, if a composition on image has hardly been changed for a long time, an extraction occurrence frequency for extraction from earlier moving pictures can be set high, and an extraction occurrence frequency for extraction from later moving pictures can be set low.

Meanwhile, in FIG. 12, an increasing rate of one extension process of the minimum wait time differs between the solid line and the broken line. In other words, the increasing rate for the case where a human is captured in image (the solid line) is smaller than the increasing rate for the case where a human is not captured in image (the broken line). Using the evaluation criteria presented in FIG. 9, it is also possible to set a smaller increasing rate for the case where a person with a higher evaluation value is captured. Thereby, it is possible to increase the extraction occurrence frequency for a person highly interesting for the user, and to decrease the extraction occurrence frequency for a person less interesting for the user or a person not interesting for the user.

Besides the method presented in FIG. 11, there is also a method of changing the evaluation threshold values for evaluating scenes (frames), every time one still picture is extracted, when the still picture evaluation presented in FIG. 10 is performed. For example, if a composition change amount is kept equal to or smaller than a predetermined amount, it is possible to set an evaluation threshold value for extracting the first still picture to be 40 points, and an evaluation threshold value for extracting the second still picture to be 50 points. In other words, a value equal to or greater than the evaluation threshold value used in extraction of the first still picture is set to be the evaluation threshold value used in extraction of the second still picture. Thereby, even in other cases except the case where the image does not include a human face, extraction of appropriate still pictures can be automatically performed in consideration of a composition change amount.

In this case, the temporal changes of the minimum wait times presented in FIG. 12 can also be applied to temporal changes of evaluation threshold values. In this case, the solid line in FIG. 12 represents a temporal change of an evaluation threshold value when captured moving pictures include a human face. Likewise, the broken line in FIG. 12 represents a temporal change of an evaluation threshold value when captured moving pictures do not include any human face.

As presented in FIG. 12, the evaluation threshold value may is be changed according to details of the captured object. More specifically, when a composition change amount is kept equal to smaller than a predetermined amount, an evaluation threshold value can be incremented at a predetermined increasing rate every time one still picture is extracted. Then, as the person captured in the moving pictures has a higher evaluation value, the increasing rate for one extension process is set to be smaller.

If a composition is dramatically changed in the captured moving pictures, namely, if a composition change amount is larger than a predetermined amount, it is also possible to reset the changed minimum wait time or evaluation threshold value (namely, to set a predetermined initial value).

It is still possible to differ a timing of the resetting, between the case where a registered person is captured as an object and the case where any registered person is not captured. For example, the minimum wait time or the evaluation threshold value is set to be a predetermined initial value (reset processing) every predetermined time period. Then, as video includes a person having a higher evaluation value, and/or the composition change amount is larger, the predetermined time period (reset cycle) can be set shorter.

Next, the still picture extraction performed by the camcorder 100 is described with reference to FIGS. 3A and 12. The following description is an example of evaluation for each of scenes consisting of moving pictures. However, the evaluation may be performed for each picture, for example.

First, the still picture extraction starts when capturing of moving pictures starts (Yes at S11). More specifically, the still picture extraction starts, when the user presses the input button 208 illustrated in FIG. 2 to instruct start of capturing moving pictures, for example. Then, when the capturing processing starts, moving pictures captured by the imaging unit 110 are recorded onto the recording medium 170 and also provided to the attribute information generation unit 120 and the still picture extraction unit 140.

Next, the attribute information generation unit 120 generates attribute information for each of scenes in the moving pictures captured by the imaging unit 110 (S12). The generated attribute information includes, for example, not only the "kinds of attribute information" in the evaluation criteria presented in FIG. 9, but also composition change amount information and the like. Then, the generated attribute information is provided to the evaluation unit 130, the threshold value change unit 150, and the extraction interval change unit 160.

The composition change amount information is calculated by the method described earlier. In the method, for example, a composition change amount may be calculated between a representative picture in a target scene and a representative picture in a scene immediately prior to the target scene. It is also possible to calculate a composition change amount between a representative picture in a target scene and the latest extracted still picture.

Next, the evaluation unit 130 evaluates moving pictures captured by the imaging unit 110 for each of the scenes, based on the pieces of attribute information generated by the attribute information generation unit 120. The pieces of attribute information are applied to the evaluation criteria presented in FIG. 9, for example. The resulting evaluation values are provided to the still picture extraction unit 140.

Next, the still picture extraction unit 140 compares a target evaluation value calculated by the evaluation unit 130 to an evaluation threshold value (S14). At the start of the still picture extraction, the evaluation threshold value is previously set to as an initial value. Then, if the target evaluation value is equal to or less than the evaluation threshold value (No at S14), then the still picture extraction unit 140 skips the subsequent steps (S15 to S18) without extracting any still picture from the scene corresponding to the target evaluation value.

On the other hand, if the target evaluation value exceeds the evaluation threshold value (Yes at S14), it is determined that the target scene includes a picture to be extracted as a still picture. However, before actually extracting the still picture, the extraction interval change unit 160 calculates a minimum wait time (S15). In this example, the minimum wait time is assumed to be calculated with reference to the table of FIG. 11. More specifically, the minimum wait time is calculated, based on the person information and the composition change amount which are included in the pieces of attribute information generated by the attribute information generation unit 120. The calculated minimum wait time is provided to the still picture extraction unit 140. When any still picture has not yet been extracted, the minimum wait time is set to be 0 second.

Next, the still picture extraction unit 140 determines whether or not an elapsed time from immediately previous still picture extraction until the presence exceeds the minimum wait time (S16). If the elapsed time is equal to or shorter than the minimum wait time (No at S16), then the still picture extraction unit 140 skips the subsequent steps (S17 to S18).

On the other hand, if the elapsed time exceeds the minimum wait time (Yes at S16), then the still picture extraction unit 140 extracts a still picture from the target scene (S17). The extracted still picture corresponds to a representative time in the scene, for example. Then, the extracted still picture is recorded onto the recording medium 170.

Next, the threshold value change unit 150 calculates an evaluation threshold value (S18). In this example, the evaluation threshold value is assumed to be calculated with reference to the table of FIG. 12. More specifically, while the composition change amount included in the pieces of attribute information is kept equal to or smaller than a predetermined amount, an evaluation threshold value is incremented at a predetermined increasing rate after each still picture extraction (S17). This increasing rate is controlled to be smaller, as an evaluation value associated with the person information included in the pieces of attribute information is higher. On the other hand, if the composition change amount exceeds the predetermined amount, then the threshold value change unit 150 changes the evaluation threshold value to be a predetermined initial value.

Then, the camcorder 100 performs the above steps (S12 to S18) for each scene constituting moving pictures (S19). As a result, appropriate still pictures can be automatically extracted.

It should be noted that the above-described minimum wait time calculation (S15) is merely an example of processing for changing a minimum wait time, and does not limit the present invention. For another example, a minimum wait time can be calculated with reference to the table of FIG. 12. This minimum wait time calculation using FIG. 12 has already been described in detail, and is therefore not described again. Note that the minimum wait time calculation using FIG. 12 is performed after the still picture extraction (S17).

It should also be noted that the above-described evaluation threshold value calculation (S18) is merely an example of processing for changing an evaluation threshold value, and does not limit the present invention. For another example, an evaluation threshold value can be calculated using a table similar to the table of FIG. 11. More specifically, a correspondence table, in which a person captured in moving pictures, a composition change amount, and an evaluation threshold value are associated with one another, is previously generated. The correspondence table is adjusted to have a smaller evaluation threshold value, as an evaluation value of a person captured in moving pictures is higher, or as a composition change amount is larger. Then, the threshold value change unit 150 can use the correspondence table to determine a new evaluation threshold value based on (a) the person information and (b) the composition change amount which are included in the pieces of attribute information. The threshold value change unit 150 provides the new evaluation threshold value to the still picture extraction unit 140. Note that the evaluation threshold value calculation is performed prior to comparison of a calculated evaluation value to the evaluation threshold value (S14).

It is also possible to add a step of regularly resetting the evaluation threshold value after the still picture extraction (S14 to S18), for example. More specifically, an elapsed time since changing of the evaluation threshold value from the initial value by the evaluation threshold value calculation (S18) is monitored, and then if a predetermined time period has passed, then the evaluation threshold value is changed back to the initial value. The predetermined time period may be set to be shorter, as an evaluation value of a person captured in moving pictures is higher, or as a composition change amount is larger. It is also possible to add a step of regularly resetting a minimum wait time. The resetting method is the same as the resetting method for resetting an evaluation threshold value, and therefore is not described again.

With the structure according to the first embodiment, the camcorder 100 evaluates each scene while capturing the moving pictures. Based on results of the evaluation, the camcorder 100 can generate information of digest reproduction of the captured moving pictures, and automatically extract appropriate still pictures.

In the first embodiment, if there are a plurality of still pictures to be extracted, it is possible to suppress extraction of unnecessary still pictures among similar still pictures.

It should be noted that the first embodiment has been described as the camcorder 100, but the present invention is not limited to the first embodiment. For example, the present invention may be implemented as a digital still camera. Furthermore, the present invention can also be implemented as a monitor camera such as a network camera.

The present invention may be the method described in the first embodiment. In this case, the present invention may be a control method of controlling the camcorder 100 or the like described in the first embodiment.

(Other Modifications)

Although the present invention has been described using the above embodiment, the present invention is, of course, not limited to the above embodiment. The present invention may also be implemented as the followings.

One implementation of the present invention may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor executes the computer program to cause the present invention to perform its functions. Here, the computer program consists of combinations of instruction codes for issuing instructions to the computer to execute predetermined functions.

It should be noted that a part or all of the structural elements included in the above device according to the present embodiment may be implemented into a single Large Scale Integration (LSI). The system LSI is a super multi-function LSI that is a single chip into which a plurality of structural elements are integrated. More specifically, the system LSI is a computer system including a microprocessor, a ROM, a RAM, and the like. The RAM holds a computer program. The microprocessor executes the computer program to cause the system LSI to perform its functions.

It should also be noted that a part or all of the structural elements included in the above device according to the present embodiment may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI.

The microprocessor executes the computer program to cause the IC card or the module to perform its functions. The IC card or the module may have tamper resistance.

It should also be noted that the present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blue-ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to be transferred, or may be transmitted via a network or the like, so that the program or the digital signals can be executed by a different independent computer system.

It should also be noted that the above-described implementations may be combined.

Although the embodiment according to the present invention has been described with reference to the drawings, the present invention is not limited to the embodiment illustrated in the drawings. The embodiment illustrated in the drawings may be modified and varied within the same meanings and the scope of the present invention.

Industrial Applicability

The present invention is useful as an image capturing device that automatically extracts (records) appropriate still pictures from moving pictures while capturing the moving pictures.

Numerical References
  100 camcorder
  110 imaging unit
  120 attribute information generation unit
  130 evaluation unit
  140 still picture extraction unit
  150 threshold value change unit
  160 extraction interval change unit
  170 recording medium
  200 lens group
  201 imaging device
  202 moving picture ADC
  203 moving picture signal conversion circuit
  204 CPU
  205 clock
  206 lens control module
  206a lens control motor
  206b lens position sensor
  207 attitude detection sensor
  207a, 308a acceleration sensor
  207b, 308b angular velocity sensor
  207c, 308c elevation/depression angle sensor
  208 input button
  209 display
  210 loudspeaker
  211 output I/F
  212 compression/decompression circuit
  213 ROM
  215 HDD
  216 audio ADC
  217 microphone
  218 memory card
  300 lens unit
  301 imaging unit
  302 moving picture AD conversion unit
  303 moving picture signal processing unit
  304 moving picture signal compression unit
  305 imaging control unit
  306 moving picture analysis unit
  307 lens control unit
  307a zoom control unit
  307b focus control unit
  307c stabilization control unit
  308 attitude detection unit
  309 attribute information generation unit
  310 scene analysis unit
  311 reproduction information generation unit
  312 audio analysis unit
  313 audio signal compression unit
  314 multiplex unit
  315 storage unit
  316 digest reproduction unit
  317 moving picture signal decompression unit
  318 display unit
  319 audio signal decompression unit
  320 audio output unit
  321 audio AD conversion unit
  322 microphone unit
  323 external input unit
  324 still picture analysis unit
  325 still picture signal decompression unit

The invention claimed is:

1. An image capturing device comprising:
an imaging unit configured to capture moving pictures;
an attribute information generation unit configured to generate attribute information indicating features of the moving pictures captured by said imaging unit;
an evaluation unit configured to apply the attribute information generated by said attribute information generation unit to a predetermined evaluation criterion, so as to calculate an evaluation value of the moving pictures for each predetermined time width;
a still picture extraction unit configured, when the evaluation value calculated by said evaluation unit exceeds an evaluation threshold value, to extract a still picture from the predetermined time width corresponding to the exceeding evaluation value among the moving pictures; and
a threshold value change unit configured to change the evaluation threshold value based on at least one of person information and a composition change amount which are included in the attribute information, the person information being used for specifying a person captured in the moving pictures, and the composition change amount being an amount of change in image compositions between the moving pictures, wherein said threshold value change unit is configured to increment the evaluation threshold value at a predetermined increasing rate every time the still picture is extracted by said still picture extraction unit, while the composition change amount is kept equal to or smaller than a predetermined amount, wherein the evaluation criterion defines a correspondence relationship between the person information and the evaluation value, the evaluation value being associated with a case where the person is captured in the moving pictures, and said threshold value change unit is configured to change the predetermined increasing rate smaller as the evaluation value associated with the person information included in the attribute information is higher.

2. An image capturing device comprising:

an imaging unit configured to capture moving pictures;

an attribute information generation unit configured to generate attribute information indicating features of the moving pictures captured by said imaging unit;

an evaluation unit configured to apply the attribute information generated by said attribute information generation unit to a predetermined evaluation criterion, so as to calculate an evaluation value of the moving pictures for each predetermined time width;

a still picture extraction unit configured, when the evaluation value calculated by said evaluation unit exceeds an evaluation threshold value, to extract a still picture from the predetermined time width corresponding to the exceeding evaluation value among the moving pictures; and a threshold value change unit configured to change the evaluation threshold value based on at least one of person information and a composition change amount which are included in the attribute information, the person information being used for specifying a person captured in the moving pictures, and the composition change amount being an amount of change in image compositions between the moving pictures, wherein said threshold value change unit is configured to:

change the evaluation threshold value to be a predetermined initial value every predetermined time period; and change the predetermined time period based on at least one of the person information and the composition change amount.

3. An image capturing device comprising:

an imaging unit configured to capture moving pictures;

an attribute information generation unit configured to generate attribute information indicating features of the moving pictures captured by said imaging unit;

an evaluation unit configured to apply the attribute information generated by said attribute information generation unit to a predetermined evaluation criterion, so as to calculate an evaluation value of the moving pictures for each predetermined time width;

a still picture extraction unit configured, when the evaluation value calculated by said evaluation unit exceeds an evaluation threshold value, to extract a still picture from the predetermined time width corresponding to the exceeding evaluation value among the moving pictures; and a threshold value change unit configured to change the evaluation threshold value based on at least one of person information and a composition change amount which are included in the attribute information, the person information being used for specifying a person captured in the moving pictures, and the composition change amount being an amount of change in image compositions between the moving pictures, wherein said still picture extraction unit is configured to extract a second still picture after at least a minimum wait time has passed since extraction of a first still picture, and said image capturing device further comprises an extraction interval change unit configured to change the minimum wait time based on at least one of the person information and the composition change amount.

4. The image capturing device according to claim 3, wherein the evaluation criterion defines a correspondence relationship between the person information and the evaluation value, the evaluation value being associated with a case where the person is captured in the moving pictures, and said extraction interval change unit is configured to change the minimum wait time shorter as the evaluation value associated with the person information included in the attribute information is higher.

5. The image capturing device according to claim 3, wherein said extraction interval change unit is configured to change the minimum wait time shorter as the composition change amount is larger.

6. The image capturing device according to claim 3, wherein said extraction interval change unit is configured to increment the minimum wait time at a predetermined increasing rate every time the still picture is extracted by said still picture extraction unit, while the composition change amount is kept equal to or smaller than a predetermined amount.

7. The image capturing device according to claim 3, wherein said extraction interval change unit is configured to change the minimum wait time to a predetermined initial value, when the composition change amount exceeds a predetermined value.

8. An image capturing method comprising:

capturing moving pictures;

generating attribute information indicating features of the moving pictures captured in said capturing;

applying the attribute information generated in said generating to a predetermined evaluation criterion, so as to calculate an evaluation value of the moving pictures for each predetermined time width;

extracting a still picture from the predetermined time width corresponding to an evaluation value calculated in said applying among the moving pictures, when the evaluation value exceeds an evaluation threshold value; and changing the evaluation threshold value based on at least one of person information and a composition change amount which are included in the attribute information, the person information being used for specifying a person captured in the moving pictures, and the composition change amount being an amount of change in image compositions between the moving pictures, wherein said extracting further comprises extracting a second still picture after at least a minimum wait time has passed since extraction of a first still picture, and said image capturing method further comprises changing the minimum wait time based on at least one of the person information and the composition change amount.

9. A non-transitory computer-readable recording medium for use in a computer to capture image, said recording medium having a computer program recorded thereon for causing the computer to execute an image capturing method, the image capturing method comprising:

capturing moving pictures;

generating attribute information indicating features of the moving pictures captured in said capturing;

applying the attribute information generated in said generating to a predetermined evaluation criterion, so as to calculate an evaluation value of the moving pictures for each predetermined time width;

extracting a still picture from the predetermined time width corresponding to an evaluation value calculated in said applying among the moving pictures, when the evaluation value exceeds an evaluation threshold value; and changing the evaluation threshold value based on at least one of person information and a composition change amount which are included in the attribute information, the person information being used for specifying a person captured in the moving pictures, and the composition change amount being an amount of change in image compositions between the moving pictures, wherein said extracting further comprises extracting a second still picture after at least a minimum wait time has passed since extraction of a first still picture, and the image capturing method further comprises changing the minimum wait time based on at least one of the person information and the composition change amount.

10. An integrated circuit comprising:

an imaging unit configured to capture moving pictures;

an attribute information generation unit configured to generate attribute information indicating features of the moving pictures captured by said imaging unit;

an evaluation unit configured to apply the attribute information generated by said attribute information generation unit to a predetermined evaluation criterion, so as to calculate an evaluation value of the moving pictures for each predetermined time width;

a still picture extraction unit configured, when the evaluation value calculated by said evaluation unit exceeds an evaluation threshold value, to extract a still picture from the predetermined time width corresponding to the exceeding evaluation value among the moving pictures; and a threshold value change unit configured to change the evaluation threshold value based on at least one of person information and a composition change amount which are included in the attribute information, the person information being used for specifying a person captured in the moving pictures, and the composition change amount being an amount of change in image compositions between the moving pictures, wherein said still picture extraction unit is configured to extract a second still picture after at least a minimum wait time has passed since extraction of a first still picture, and said integrated circuit further comprises an extraction interval change unit configured to change the minimum wait time based on at least one of the person information and the composition change amount.

* * * * *